United States Patent
Nagao

(10) Patent No.: US 7,562,155 B2
(45) Date of Patent: Jul. 14, 2009

(54) SYSTEM, METHOD, AND COMPUTER PROGRAM FOR A CONSOLE SWITCH

(75) Inventor: Naoyuki Nagao, Shinagawa (JP)

(73) Assignee: Fujitsu Component Limited, Tokyo (JP)

(*) Notice: Subject to any disclaimer, the term of this patent is extended or adjusted under 35 U.S.C. 154(b) by 808 days.

(21) Appl. No.: 10/763,162

(22) Filed: Jan. 26, 2004

(65) Prior Publication Data

US 2004/0153571 A1 Aug. 5, 2004

(30) Foreign Application Priority Data

Jan. 31, 2003 (JP) ............... 2003-022948

(51) Int. Cl.
G06F 15/173 (2006.01)
(52) U.S. Cl. ............... 709/238; 709/244; 709/248
(58) Field of Classification Search ........... 709/223, 709/224, 227–228, 245, 248, 238, 244
See application file for complete search history.

(56) References Cited

U.S. PATENT DOCUMENTS

| | | | | | |
|---|---|---|---|---|---|
| 5,675,510 | A * | 10/1997 | Coffey et al. | ............... | 709/224 |
| 6,505,245 | B1 * | 1/2003 | North et al. | ............... | 709/223 |
| 6,717,913 | B1 * | 4/2004 | Ghahremani et al. | ........ | 370/230 |
| 6,816,897 | B2 * | 11/2004 | McGuire | ............... | 709/223 |
| 6,857,005 | B2 * | 2/2005 | Kistler et al. | ............... | 709/203 |
| 6,917,626 | B1 * | 7/2005 | Duvvury | ............... | 370/466 |
| 6,947,415 | B1 * | 9/2005 | Nagaraj | ............... | 370/389 |
| 6,950,932 | B1 * | 9/2005 | Lavian et al. | ............... | 713/151 |
| 6,970,913 | B1 * | 11/2005 | Albert et al. | ............... | 709/217 |
| 7,013,334 | B2 * | 3/2006 | Toyoshima et al. | ......... | 709/223 |
| 2002/0161873 | A1 * | 10/2002 | McGuire | ............... | 709/223 |
| 2002/0161874 | A1 * | 10/2002 | McGuire | ............... | 709/223 |
| 2002/0194497 | A1 * | 12/2002 | McGuire | ............... | 713/201 |
| 2003/0002492 | A1 * | 1/2003 | Gallagher et al. | ........... | 370/360 |
| 2003/0018770 | A1 * | 1/2003 | Bae | ............... | 709/223 |
| 2003/0154306 | A1 * | 8/2003 | Perry | ............... | 709/245 |
| 2003/0172145 | A1 * | 9/2003 | Nguyen | ............... | 709/223 |
| 2004/0044771 | A1 * | 3/2004 | Allred et al. | ............... | 709/227 |
| 2004/0052040 | A1 * | 3/2004 | Laurosch et al. | ............ | 361/683 |
| 2004/0071134 | A1 * | 4/2004 | Vadivelu | ............... | 370/373 |
| 2004/0146056 | A1 * | 7/2004 | Martin | ............... | 370/401 |
| 2004/0160954 | A1 * | 8/2004 | Shimizu et al. | ............. | 370/389 |
| 2004/0249975 | A1 * | 12/2004 | Tuck et al. | ............... | 709/245 |
| 2005/0207414 | A1 * | 9/2005 | Duvvury | ............... | 370/389 |
| 2005/0213560 | A1 * | 9/2005 | Duvvury | ............... | 370/351 |

FOREIGN PATENT DOCUMENTS

JP 5-298224 11/1993
JP 2000-112851 4/2000

* cited by examiner

Primary Examiner—William C Vaughn, Jr.
Assistant Examiner—Scott Christensen
(74) Attorney, Agent, or Firm—Staas & Halsey LLP

(57) ABSTRACT

A console switch selectively connects a terminal to a port of an information processing device that has a plural number of ports connected through a network. This console switch includes: a first unit that obtains port information from the terminal, the port information specifying the port; and a second unit that refers to a predetermined database in accordance with the port information obtained by the first unit, and establishes a connection path between the terminal and the port of the information processing device.

25 Claims, 28 Drawing Sheets

Fig. 2 (PRIOR ART)

```
Microsoft Windows XP [Version 5.1.2600]
 (C) Copyright 1985-2001 Microsoft Corp.

C:¥>telnet 192.168.0.15
```

Fig. 3 (PRIOR ART)

```
Fujitsu Console Switch * Ver.0.1a
------------------------------------
login
```

Fig. 4(PRIOR ART)

```
Fujitsu Console Switch * Ver.0.1a
----------------------------------
login: testname
Password:

Last login: Thu Aug  8 14:52:24
testname#>
```

Fig. 5(PRIOR ART)

```
Fujitsu Console Switch * Ver.0.1a
----------------------------------
login: testname
Password:

Last login: Thu Aug  8 14:52:24
testname#>open 2
```

Fig. 6 (PRIOR ART)

```
Fujitsu Console Switch * Ver.0.1a
----------------------------------
login: testname
Password:

Last login: Thu Aug  8 14:52:24
testname#>open 2

Welcome Xxx Yyy (apollo)

login: xyz
Password:
Last login: Thu Aug  8 16:21:31 from xyz apollo%
```

Fig. 7 (PRIOR ART)

```
Fujitsu Console Switch * Ver.0.1a
----------------------------------
login: testname
Password:

Last login: Thu Aug  8 14:52:24
testname#>open 2

Welcome Xxx Yyy (apollo)

login: xyz
Password:
Last login: Thu Aug  8 16:21:31 from xyz apollo% exit
```

Fig. 8 (PRIOR ART)

```
Fujitsu Console Switch * Ver.0.1a
---------------------------------
login: testname
Password:

Last login: Thu Aug  8 14:52:24
testname#>open 2

Welcome Xxx Yyy (apollo)

login: xyz
Password:
Last login: Thu Aug  8 16:21:31 from xyz apollo% exit testname#>
testname#>
```

Fig. 12

| C1 | C2 | C3 | C4 | C5 | C6 | C7 | C8 | C9 | C10 | C11 | C12 |
|---|---|---|---|---|---|---|---|---|---|---|---|
| 0031, | 1, | zeus, | 1, | 12, | 192.168.0.3, | 00:01:A1:23:99:01, | abcdefg, | 95j+1!45rz34ni3lk4j, | 1, | 10.0.0.2, | 5001 |
| 0032, | 2, | appllo, | 1, | 12, | 192.168.0.3, | 00:01:A1:23:99:01, | abcdefg, | 95j+1!45rz34ni3lk4j, | 0, | 10.0.0.2, | 5002 |
| 0033, | 3, | gaia, | 1, | 12, | 192.168.0.3, | 00:01:A1:23:99:01, | abcdefg, | 95j+1!45rz34ni3lk4j, | 0, | 10.0.0.2, | 5003 |
| 0034, | 4, | michel, | 1, | 12, | 192.168.0.3, | 00:01:A1:23:99:01, | abcdefg, | 95j+1!45rz34ni3lk4j, | 1, | 10.0.0.2, | 5012 |
| 0035, | 5, | Poseidon, | 1, | 12, | 192.168.0.3, | 00:01:A1:23:99:01, | abcdefg, | 95j+1!45rz34ni3lk4j, | 1, | 10.0.0.2, | 5060 |
| .. | | | | 12, | .. | .. | .. | .. | .. | .. | |
| .. | | | | 12, | .. | .. | .. | .. | .. | .. | |
| 0121, | 12, | dxt0007, | 0, | 13, | 192.168.0.15, | 20:13:DA:91:56:21, | k59kga, | 85932HklNkkljasFF, | 1, | 10.0.0.2, | 5031 |
| .. | | | | 13, | .. | | | | .. | .. | |

Fig. 13

| C1: PORT NUMBER (SERIAL NUMBER) | C2: PORT NUMBER (DEVICE BASE) | C3: NAME | C4: POSSIBILITY OF AUTO. CONNECTION | C5: CONNECTING METHOD | C6: IP ADDRESS OF DESTINATION DEVICE | C7: MAC ADDRESS OF DESTINATION DEVICE | C8: ACCOUNT NAME | C9: PASSWORD | C10: STATUS | C11: TERMINAL IP ADDRESS | C12: CONNECTING PORT |
|---|---|---|---|---|---|---|---|---|---|---|---|
| | | | | | | | | | | | |

Fig. 16

```
Microsoft Windows XP [Version 5.1.2600]
(C) Copyright 1985-2001 Microsoft Corp.

C:¥>telnet 10.0.0.1
```

Fig. 17

```
Fujitsu Console Switch * Ver.0.1a
-----------------------------------
login:
```

Fig. 18

```
Enter Server No. or Name
testname#>
```

Fig. 19

```
Enter Server No. or Name
testname#> 32
```

Fig. 20

```
Enter Server No. or Name
testname#> 32
#############################################
Select 32.already auto connected ###
#############################################
apollo%
apollo%
```

Fig. 21

```
Enter Server No. or Name
testname#> 11
##########################################
Select 11 by Operation Panel ###
##########################################
############################
Connected 32 (Fujitsu) ###
############################
fujitsu%
fujitsu%
```

Fig. 22

| C1 | C2 | C3 | C4 | C5 | C6 | C7 | C8 | C9 | C10 | C11 | C12 |
|---|---|---|---|---|---|---|---|---|---|---|---|
| 0032, | 2, | appllo, | 1, | 12, | 192.168.0.3, | 00:E0:00:EE:01:01, | abcdefg, | 132456, | 1, | 10.0.0.2, | 5002 |

Fig. 23

| C1 | C2 | C3 | C4 | C5 | C6 | C7 | C8 | C9 | C10 | C11 | C12 |
|----|----|----|----|----|----|----|----|----|-----|-----|-----|
| 0011, | 2, | fujitsu, | 1, | 12, | 192.168.0.12, | 00:E0:00:EE:06:B7, | qwerty, | 3154987, | 0, | ****, | **** |

SYSTEM, METHOD, AND COMPUTER PROGRAM FOR A CONSOLE SWITCH

BACKGROUND OF THE INVENTION

1. Field of the Invention

The present invention relates to a console switch, and also relates to a system, a path connecting method, and a path connecting program each using the console switch.

2. Description of the Related Art

Conventionally, there have been devices such as terminal servers, console servers, and console switches. Such devices as terminal servers, console servers, and console switches, execute connection application such as Telnet, and mediate connections among the application, other devices, and selected serial ports.

Japanese Laid-Open Patent Publication No. 5-298224 (hereinafter referred to as "Patent Document 1") discloses a console switch having the above functions. This console switch disclosed in Patent Document 1 selects one of the servers in the network, and designates the selected server as an access server. Serial ports are then connected to the access server. A remote access terminal selects servers connected to the serial ports, and connects to the selected servers, so that debugging and program reloading can be performed for the selected servers by remote control. Thus, a remote console can access two or more server consoles through a connection to a single server.

Japanese Laid-Open Patent Publication No. 2000-112851 (hereinafter referred to as "Patent Document 2") discloses another conventional technique. In a system disclosed in Patent Document 2, when a request for address allocation is received from a terminal, a DNS (Domain Name System) server is notified of a DHCP (Dynamic Host Configuration Protocol) server, an IP (Internet Protocol) address, and the MAC (Media Access Control) address corresponding to the IP address. The DNS server sets the matching information of the host name of the terminal corresponding to the MAC address and the IP address in a DNS table. If there is an inquiry about the IP address of the terminal later, The IP address corresponding to the host name of the terminal is extracted from the DNS table and sent to the inquirer. In this manner, the DHCP server and the DNS server cooperates with each other, and the address resource is efficiently used by virtue of dynamic IP address allocation with DHCP. Also, accesses can be made among terminals with host names using DNS.

As another example of the prior art, a console switch shown in FIG. 1 has been developed. FIG. 1 illustrates a system structure using the conventional console switch. As shown in FIG. 1, a system 700 includes terminals 701 and 702, a maintenance LAN 703, a backbone LAN 704, console switches 710 through 71n, and servers S0001 through Sxx16. There are two types of LAN in the system 700; one is the maintenance LAN 703, and the other is the backbone LAN 704. The terminals 701 and 702 in which Telnet is to be executed are connected to the console switches 710 through 71n through the maintenance LAN 703.

The servers S0001 through Sxx16 connected to the console switches 710 through 71n are all connected to the backbone LAN 704, and accordingly, are separated from the maintenance LAN 703. Since the backbone LAN 704 and the maintenance LAN 703 are separated from each other, even if there is a problem caused in the backbone LAN 704, connections can be established with the serial ports of the servers S0001 through Sxx16 through the console switches 710 through 71n connected to the maintenance LAN 703. While the connections are being maintained, the cause of the problem in the backbone LAN 704 can be investigated.

The servers S0001 through Sxx16 are equipped with serial ports that are to be connected to the corresponding serial ports of the console switches 710 through 71n. The console switches 710 through 71n are connected to the maintenance LAN 703, and the terminals 701 and 702 are also connected to the maintenance LAN 703. The terminals 701 and 702 are connected to the console switches 710 through 71n via the maintenance LAN 703 using an interface such as a Telnet interface.

Here, a connecting operation to be performed to connect the terminal 701 to a serial port via the console switch 711 will be described. In this operation, the terminal 701 connects to the console switch 711 using Telnet, and switches connection destinations. In FIG. 1, the terminal 701 is to connect to the server S0018, named "apollo", which is connected to the serial port No. 2 of the console switch 711 that has the IP address "192.168.0.15".

In this operation, the terminal 701 that executes Telnet first needs to connect to the console switch 711. FIG. 2 shows a screen for making an access using Telnet. As can be seen from FIG. 2, the terminal 701 is a personal computer in which Microsoft Windows (a registered trademark) XP operates, and Telnet is executed in accordance with a Telnet program that is included in the default setting of Windows XP.

In FIG. 2, the terminal 701 is to connect to the console switch 711 having the IP address "192.168.0.15" through Telnet. When the enter key is pressed after the IP address is inputted as shown in FIG. 2, the terminal 701 is connected to the console switch 711 through Telnet, and has a login screen that indicates the login with the console switch 711, as shown in FIG. 3.

If a login can be carried out with "testname", for example, the screen switches to a connecting screen shown in FIG. 4, after the input of "testname" as shown in FIG. 3. At the stage shown in FIG. 4, the terminal 701 completes the connection to the console switch 711 having the IP address "192.168.0.15". The operation of connecting to the serial port No. 2 of the console switch 711 is then performed. So as to connect to a serial port of the console switch 711, an "open" command is executed in Telnet, so that the operation of connecting to the serial port No. 2 is started, as shown in FIG. 5. Once the connection to the port No. 2 is started, the screen shown in FIG. 5 switches to the screen shown in FIG. 6.

FIG. 6 shows the screen displaying data outputted from the serial console interface of the server S0018 that is connected to the port No. 2 of the console switch 711. When the connection is completed, the terminal 701 can operate as if connected directly to the serial port of the server S0018, though the terminal 701 is only indirectly connected to the serial port of the server S0018 via the console switch 711.

So as to switch to another server afterward, the screen switches to the screen shown in FIG. 7, so that the connection to the server S0018 is cut off. The procedures shown in FIG. 7 are carried out to cut off the connection to the port No. 2, and the terminal 701 returns to the state of being only connected to the console switch 711. When four characters "e, x, i, t" contained in an input stream are received from the terminal 701, the Telnet screen showing the connection to the serial port is ended, and returns to the screen showing that the terminal 701 has simply logged in with the console switch 711. This screen is the same as the screen shown in FIG. 4, and accordingly, the terminal 701 can connect to another server. The terminal 701 then shows a connecting screen shown in FIG. 8. To switch connections from the console switch 711 to another console switch, the procedures shown in FIGS. 4 through 8 needs to be repeated.

In a data center or the like, a large number of IP addresses and an even larger number of serial ports need to be managed in a connection list, because there are a plural number of console switches 710 through 71n. The list is searched for the name or the number of a desired server, and the serial port number and the IP address of the corresponding one of the console switches 710 through 71n are obtained. A connection to Telnet then needs to be carried out. In these procedures, it is difficult to grasp all the connection relationships. Therefore, it is very difficult to connect the terminals 701 and 702 to desired servers.

Also, the number of servers S0001 through Sxx16 that can be connected to each one of the console switches 710 through 71n is 16, 48, or the like, because the number of serial ports of the console switches 710 through 71n is much smaller than the number of servers S0001 through Sxx16, which is thousands. Therefore, it is necessary to prepare a plural number of console switches 710 through 71n for the thousands of servers S0001 through Sxx16. When the terminal 701 is to be sequentially connected to the servers S0001 through Sxx16 connected to different console switches 710 through 71n, the switching operation of executing the series of commands shown in FIGS. 2 through 8 is repeated.

In the system 700, every time connections are switched between two servers among the thousands of servers S0001 through Sxx16, the connection relationship needs to be checked, and the operations such as inputting of the IP address or the serial port number have to be performed at the time of execution of a command. This causes a problem that console switching cannot be performed frequently.

There are two types of IP address; one is IPv4, and the other is IPv6. An IPv4 address is a 32-bit address, and can be a decimal number of up to 15 digits, including periods. An IPv6 address is an address of up to 128 bits, and can be a hexadecimal number of 19 digits, including colons. Having more digits than a decimal number, a hexadecimal number requires more input characters. Therefore, an IPv4 address can be inputted through ten keys, while an IPv6 address with alphabets cannot be inputted swiftly. When the corresponding IP address is to be extracted from the list, the large number of digits and character types adds load to the checking process. This causes a problem that a terminal cannot be easily connected to a desired server.

SUMMARY OF THE INVENTION

It is therefore an object of the present invention to provide a console switch, and a system, a path connecting method, and a path connecting program each using the console switch, in which the above disadvantage is eliminated.

A more specific object of the present invention is to provide a console switch that can easily connect a terminal to the port of a desired information processing device.

Another specific object of the present invention is to provide a system, a path connecting method, and a path connecting program product each using the above console switch.

The above objects of the present invention are achieved by a console switch that selectively connects a terminal to a port of an information processing device that has a plurality of ports connected through a network, the console switch comprising: a first unit that obtains port information from the terminal, the port information specifying the port; and a second unit that refers to a predetermined database in accordance with the port information obtained by the first unit, and establishes a connection path between the terminal and the port of the information processing device.

The above objects of the present invention are also achieved by a system comprising: a terminal; an information processing device that has a plurality of ports; and a console switch that is connected to and interposed between the terminal and the information processing device, and establishes a connection path between the terminal and a port of the information processing device, the console switch comprising: a first unit that obtains port information from the terminal, the port information specifying the port; and a second unit that refers to a predetermined database in accordance with the port information obtained by the first unit, and establishes a connection path between the terminal and the port of the information processing device.

The above objects of the present invention are also achieved by a system comprising: a first console switch; and a second console switch that is connected to the first console switch through a network, the first console switch and the second console switch each selectively connecting a terminal to a port of an information processing device that has a plurality of ports connected through a network, the first console switch and the second console switch each comprising: a first unit that obtains pod information from the terminal, the port information specifying the port; and a second unit that refers to a predetermined database in accordance with the port information obtained by the first unit, and establishes a connection path between the terminal and the port of the information processing device.

The above objects of the present invention are also achieved by a method of selectively connecting a terminal to a port of an information processing device that has a plurality of ports connected through a network, the method comprising the steps of: obtaining port information from the terminal, the port information specifying the port; and referring to a predetermined database in accordance with the obtained port information, and then establishing a connection path between the terminal and the port of the information processing device.

The above objects of the present invention are also achieved by a computer program product for causing a computer to selectively connect a terminal to a port of an information processing device that has a plurality of ports connected through a network, the program comprising: instructions for obtaining port information from the terminal, the port information specifying the port; and instructions for referring to a predetermined database in accordance with the obtained port information, and then establishing a connection path between the terminal and the port of the information processing device.

BRIEF DESCRIPTION OF THE DRAWINGS

Other objects, features and advantages of the present invention will become more apparent from the following detailed description when read in conjunction with the accompanying drawings, in which:

FIG. 2 shows a conventional screen for making an access using Telnet;

FIG. 3 shows a conventional login screen;

FIG. 4 shows a conventional connecting screen;

FIG. 5 shows a conventional screen for starting a connecting operation to a port;

FIG. 6 shows a conventional screen displaying data outputted from the serial console interface of a server connected to the port;

FIG. 7 shows a conventional screen for cutting off the connection to the port;

FIG. 8 shows a conventional screen for a new connection;

FIG. 12 illustrates a database in accordance with the first embodiment;

FIG. 13 shows the format of the database shown in FIG. 12;

FIG. 16 shows the terminal screen where an access is to be made using Telnet;

FIG. 17 shows the terminal screen where a log-in operation is to be performed;

FIG. 18 shows the terminal screen where port information is to be inputted;

FIG. 19 shows the terminal screen where the port information has been inputted;

FIG. 20 shows the terminal screen that displays the connection path;

FIG. 21 shows the terminal screen that displays a newly established connection;

FIG. 22 shows the record with respect to the port number "0032" stored in the database;

FIG. 23 shows the record with respect to the port number "0011" stored in the database;

DESCRIPTION OF THE PREFERRED EMBODIMENTS

First Embodiment

Figure 1:
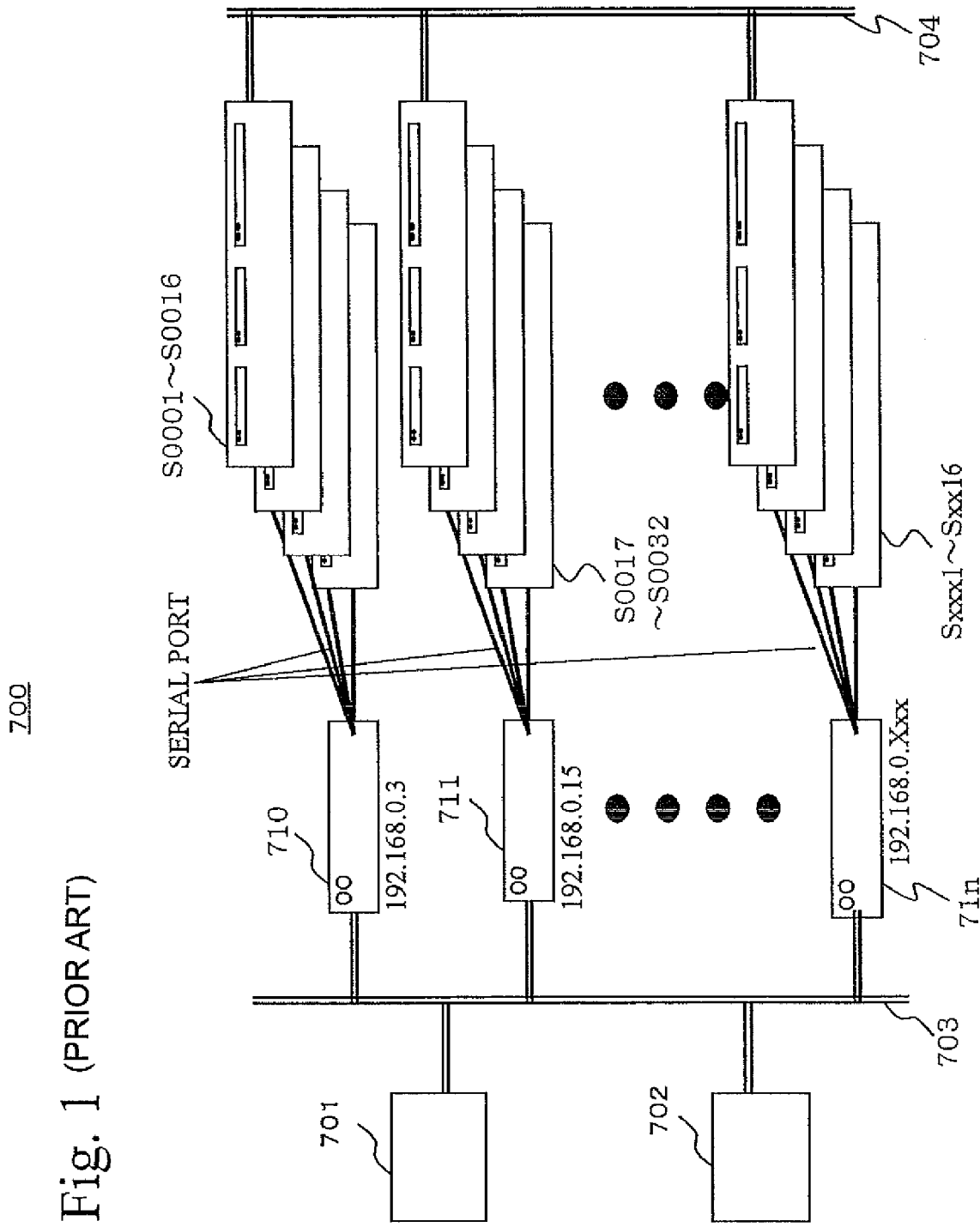
FIG. 1 illustrates a system structure that employs a conventional console switch.
Figure 9:
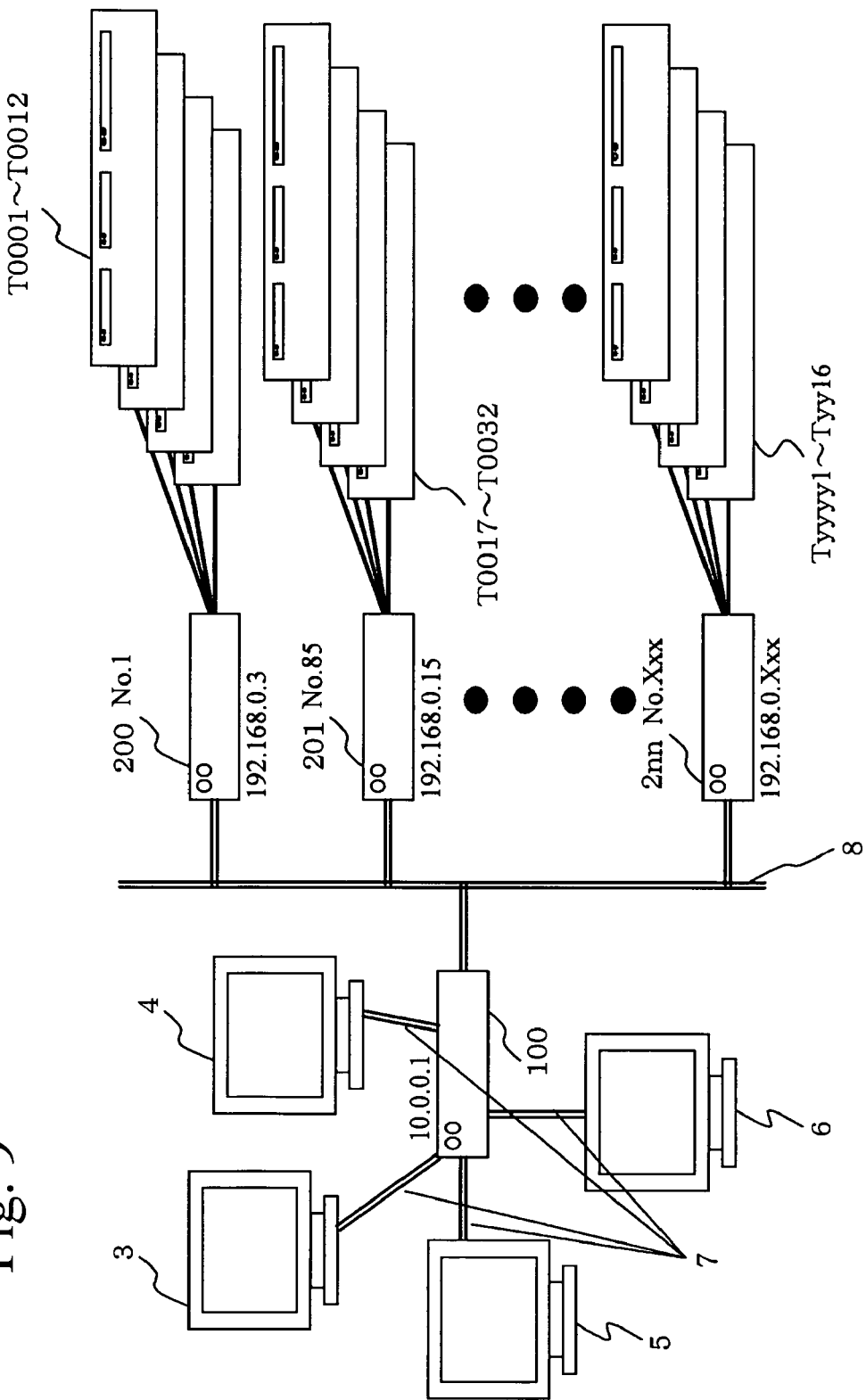
FIG. 9 illustrates a network structure that employs a console switch in accordance with a first embodiment of the present invention.

In the following, a first embodiment of the present invention will be described. FIG. 9 illustrates an example of a network structure that employs a console switch in accordance with this embodiment. In FIG. 9, reference numeral 1 indicates a system, reference numeral 100 indicates the console switch in accordance with this embodiment, reference numerals 200 through 2nn indicate conventional devices, reference numerals 3 through 6 indicate terminals, reference numeral 7 indicates a terminal LAN that connects the console switch 100 to the terminals 3 through 6, reference numeral 8 indicates a maintenance LAN that connects the console switch 100 to the conventional devices 200 through 2nn, and reference numerals 21 through 36, 37 through 42, and T0001 through Txx16 indicate servers.

As described above, the console switch 100 is connected to the conventional devices 200 through 2nn via the maintenance LAN 8. The terminals 3 through 6 are to be connected to the console switch 100, and obtain network connections through the console switch 100.

The console switch 100 connects to serial ports provided in the conventional devices 200 through 2nn. The conventional devices 200 through 2nn causes the console switch 100 to connect to a Telnet terminal, and causes the Telnet terminal to execute commands that are valid for the conventional devices 200 through 2nn, so that the console switch 100 can connect to the serial ports of the conventional devices 200 through 2nn. The console switch 100 also holds information that is necessary for connection in a database, and, according to the database, automatically connects to the serial ports of the conventional devices 200 through 2nn.

The terminal LAN 7 is a network to which the console switch 100 and the terminals 3 through 7 are connected. In a normal system, the maintenance LAN 8 is provided in a region that is closed so as to prevent operators from touching, for example. By connecting the console device 100 (a novel device) to a part of the network, accesses can be made to all the conventional devices 200 through 2nn in the network from the terminals 3 through 6 connected to the terminal LAN 7.

In each of the conventional devices 200 through 2nn, an account that is necessary for the console switch 100 to log in is set up. Using each corresponding account, the console switch 100 can automatically log in with each of the conventional devices 200 through 2nn. Here, the console switch 100 logs in with the conventional devices 200 through 2nn in accordance with the contents of the database.

If automatic login is valid with at least one of the serial ports of the conventional devices 200 through 2nn, the console switch 100 logs in with the conventional devices 200 through 2nn. If automatic login is not valid with any of the serial ports, the console switch 100 does not automatically log in with the conventional devices 200 through 2nn. In this embodiment, the conventional devices 200 through 2nn are information processing devices.

Figure 10:
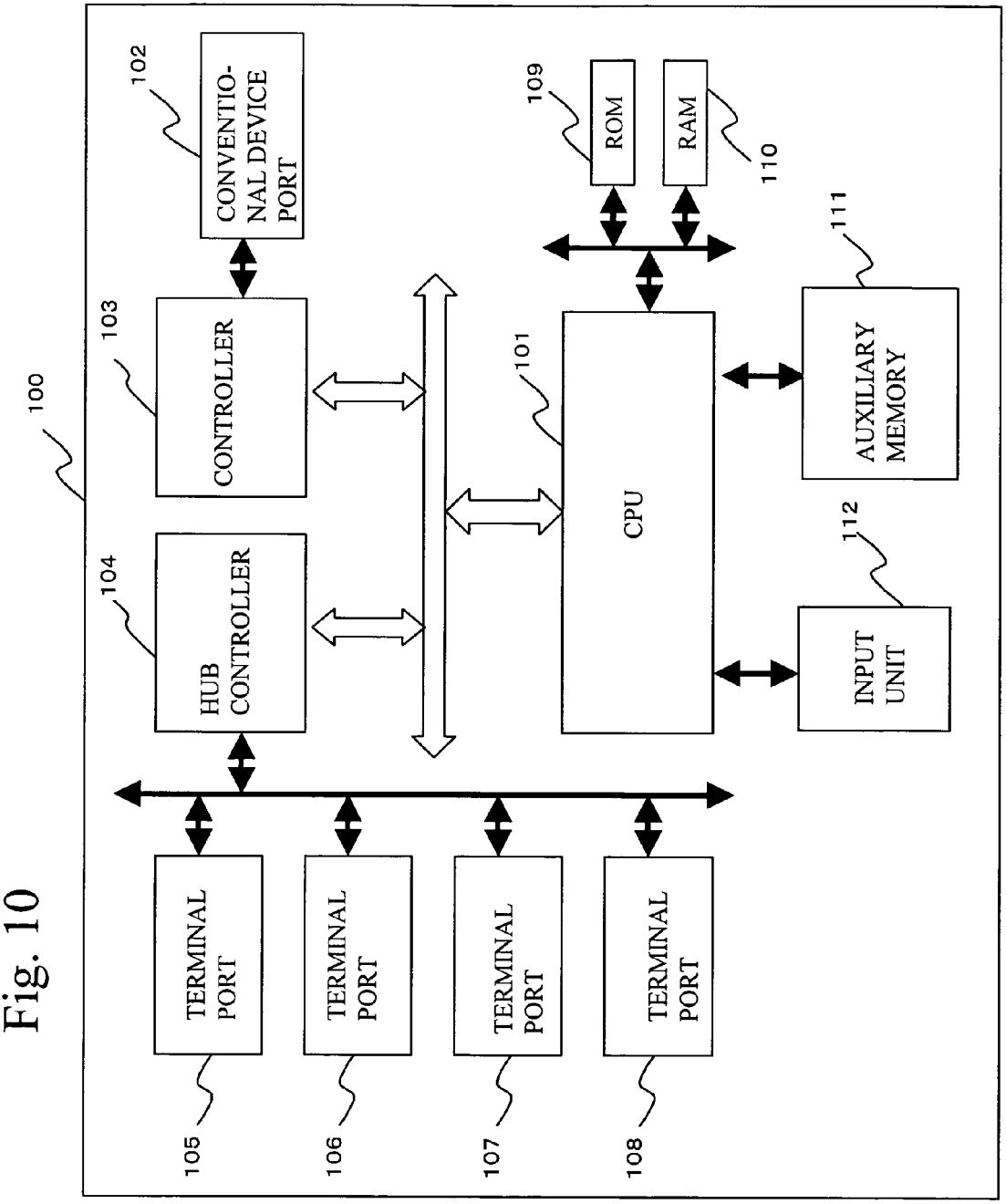
FIG. 10 shows a block diagram of the console switch in accordance with the first embodiment.

Referring now to FIG. 10, a console switch in accordance with this embodiment will be described. FIG. 10 shows a block diagram of the console switch 100 in accordance with this embodiment. As shown in FIG. 10, the console switch 100 includes a CPU (Central Processing Unit) 101, a conventional device port 102, a controller 103, a hub controller 104, terminal ports 105 through 108, a ROM 109, a RAM 110, an auxiliary memory device 111, and an input unit 112.

The conventional device port 102 includes a connector (not shown) to connect to the maintenance LAN 8. The controller 103 serves as a LAN interface. The CPU 101 and the controller 103 are bus-connected, and control is performed through the CPU 101. The hub controller 104 is also connected to the bus. The hub controller 104 forms an Ethernet (a registered trademark) hub, having a 4-port Ethernet hub structure, as shown in FIG. 10. The terminals 3 through 6 are connected to the four terminal ports 105 through 108, and the hub is cascade-connected to the terminal ports 105 through 108. Accordingly, the terminals 3 through 6 are connected to one another through the LAN.

The terminals 3 through 6 can connect to a network that has the console switch 100 as a DHCP server. The DHCP server function can be activated through the CPU 101, and an IP address is automatically allocated to each of the terminals 3 through 6 connected to the terminal ports 105 through 108.

The ROM 109 is a flash memory that is electrically rewritable. The database that will be mentioned later in detail is stored in the ROM 109. The RAM 110 records other various kinds of information. The auxiliary memory device 111 is connected to the CPU 101. Accordingly, the CPU 101 can have a memory area in addition to the RAM 110.

Figure 11:
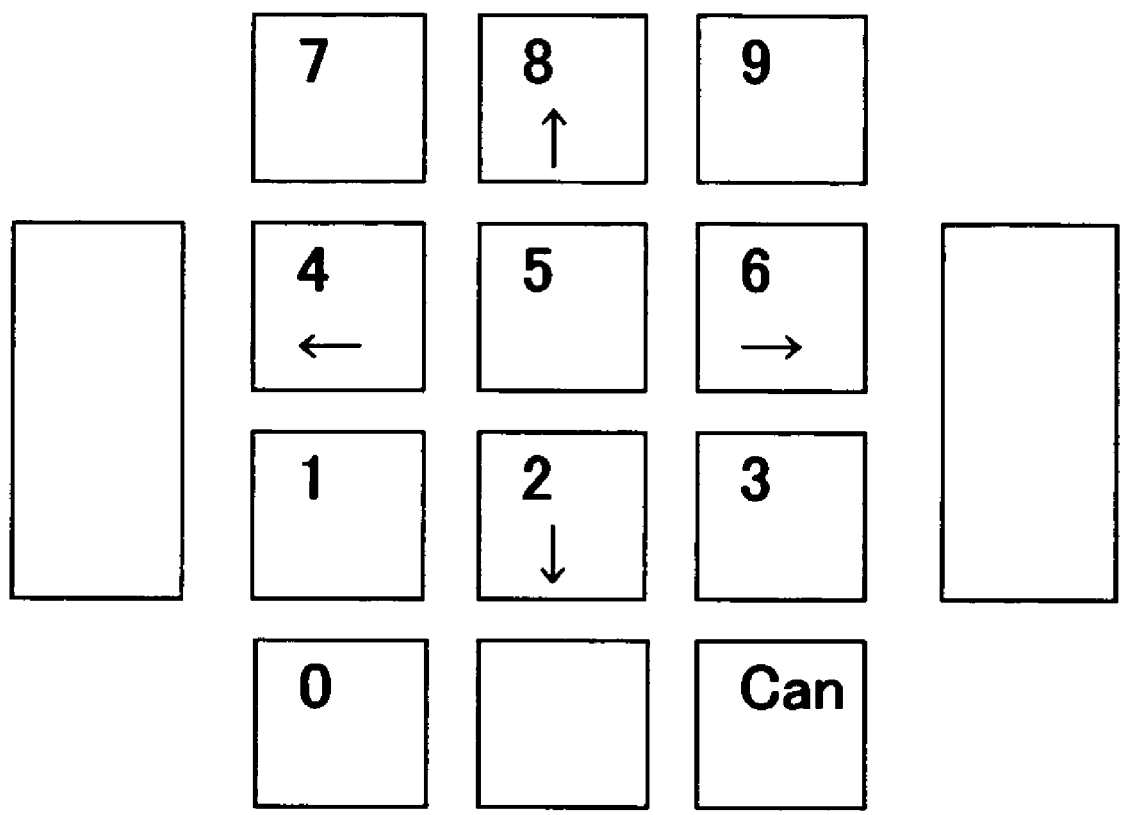
FIG. 11 illustrates an example of an input unit in accordance with the first embodiment.

The input unit 112 is also connected to the CPU 101. FIG. 11 shows an example structure of the input unit 112. The input unit 112 may be a keypad as shown in FIG. 11, and the CPU 101 can detect each key operation performed on the keypad.

The CPU 101 operates in accordance with a program stored in the ROM 109, and the program is loaded into the RAM 110 for high-speed operation. So as to connect the terminals 3 through 6 selectively to the respective ports of the conventional devices 200 through 2nn connected to one another via a network, the CPU 101 has a first function of obtaining port information from one of the terminals 3 through 6. The port information specifies each of the ports. The CPU 101 also has a second function of referring to the predetermined database in accordance with the port information obtained by the first function, and then establishing a connection path between the terminal and the corresponding port of the conventional devices 200 through 2nn.

The port information should include a port number or port name allocated to the corresponding port of the conventional devices 200 through 2nn.

The CPU 101 also has a third function of automatically connecting, after activation, to each of the ports of the conventional devices 200 through 2nn. Further, the CPU 101 has a fourth function of extracting, after activation, the MAC addresses and the IP addresses of the conventional devices 200 through 2nn, and then storing port information, associated with the MAC addresses and the IP addresses of the conventional devices 200 through 2nn, in the predetermined database.

In a case where a connection path has not yet been established to the port of the one of the conventional devices 200 through 2nn corresponding to port information obtained by the first function, the CPU 101 extracts the IP address of the corresponding one of the conventional devices 200 through 2nn in accordance with the MAC address of the corresponding one of the conventional devices 200 through 2nn specified by the port information. The CPU 101 then establishes a connection path between the terminal and the corresponding one of the conventional devices 200 through 2nn.

In a case where connection paths have been established between one of the terminals 3 through 6 and the port of one of the conventional devices 200 through 2nn, the CPU 101 outputs a message to notify the terminal that the connection has been established. This function is a fifth function of the CPU 101. The CPU 101 also stores transmission and reception data between the terminals 3 through 6 and the ports of the conventional devices 200 through 2nn in the auxiliary memory device 111 that serves as storage. The CPU 101 may also store messages that are to be outputted onto the screens of the terminals 3 through 6, in the auxiliary memory device 111.

The CPU 101 may also store all data outputted from the ports of the conventional devices 200 through 2nn in the auxiliary memory device 111. When storing transmission and reception data in the auxiliary memory device 111, the CPU 101 may associate the transmission and reception data with a date, a terminal path, user information, or a server connection path.

When a tuning button (described later) is pressed, the CPU 101 detects the pressing of the tuning button, and exchanges port information with the corresponding one of the conventional devices 200 through 2nn connected to the network. The CPU 101 may exchange port information with the other ones of the conventional devices 200 through 2nn on a regular basis.

Conventionally, terminals are connected to a network to which conventional terminals are also connected, and communicate with the conventional devices via the network that is connectable through execution of Telnet or the like, as described earlier. In this embodiment, terminals are not connected directly to the network of conventional devices, but are connected to the console switch 100.

Referring now to FIGS. 12 and 13, the above mentioned database will be described. FIG. 12 shows the contents of the database. FIG. 13 shows the format of the database shown in FIG. 12.

The database is managed as a text file.

In FIGS. 12 and 13, reference alphanumeral C1 indicates the port numbers allocated sequentially to the ports of all the conventional devices 200 through 2nn, C2 indicates the port numbers allocated sequentially within each of the conventional devices 200 through 2nn, C3 indicates the names of the ports, C4 indicates whether automatic connection is allowed, C5 indicates connecting methods, C6 indicates the IP addresses of the conventional devices 200 through 2nn as connection destinations, C7 indicates the MAC addresses of the conventional devices 200 through 2nn as connection destinations, C8 indicates the login account names of the conventional devices 200 through 2nn, C9 indicates the passwords each required to access each corresponding login account (or the password encrypted for comparison), C10 indicates current connection statuses, C11 indicates the IP address of each terminal end, and C12 indicates the connecting ports. In this database, the port numbers C1 and the port names C3 are equivalent to the port information.

So as to construct the database, the port numbers C1 are sequentially allocated to the serial ports of all the conventional devices 200 through 2nn, and are used as labels of the database. The CPU 101 checks the database to obtain information such as whether automatic connection is allowed, or which conventional device is the destination device, in accordance with the port number C1.

The console switch 100 allocates sub-numbers to the respective ports of the conventional devices 200 through 2nn, and associates the port number C1, the MAC address C7, and the port name C3 of each of the conventional devices 200 through 2nn with one another. The database can detect desired information from the port number C1 or the port name C3 associated with the subject port.

Once the MAC address is identified, the IP address can be identified by an ARP command of the Ethernet (a registered trademark) protocol stack. Accordingly, the MAC address C7 associated with the port number C1 or the port name C3 is detected from the database, and the IP address C11 corresponding to the detected MAC address C7 is detected through the ARP command. In some cases, it is possible to allocate the IP addresses.

Each of the MAC addresses is an intrinsic number with respect to a LAN controller. Therefore, as long as the conventional devices 200 through 2nn are connected to the LAN, the console switch 100 can connect to the conventional devices 200 through 2nn, using the port numbers C1 or the port names C3. The port numbers C1 and the port names C3 have some relations to servers, so that the terminals 3 through 6 can designate them. Accordingly, the terminals 3 through 6 can identify all the paths from the console switch 100 to the conventional devices 200 through 2nn, regardless of the IP addresses and the MAC addresses.

Figure 14:
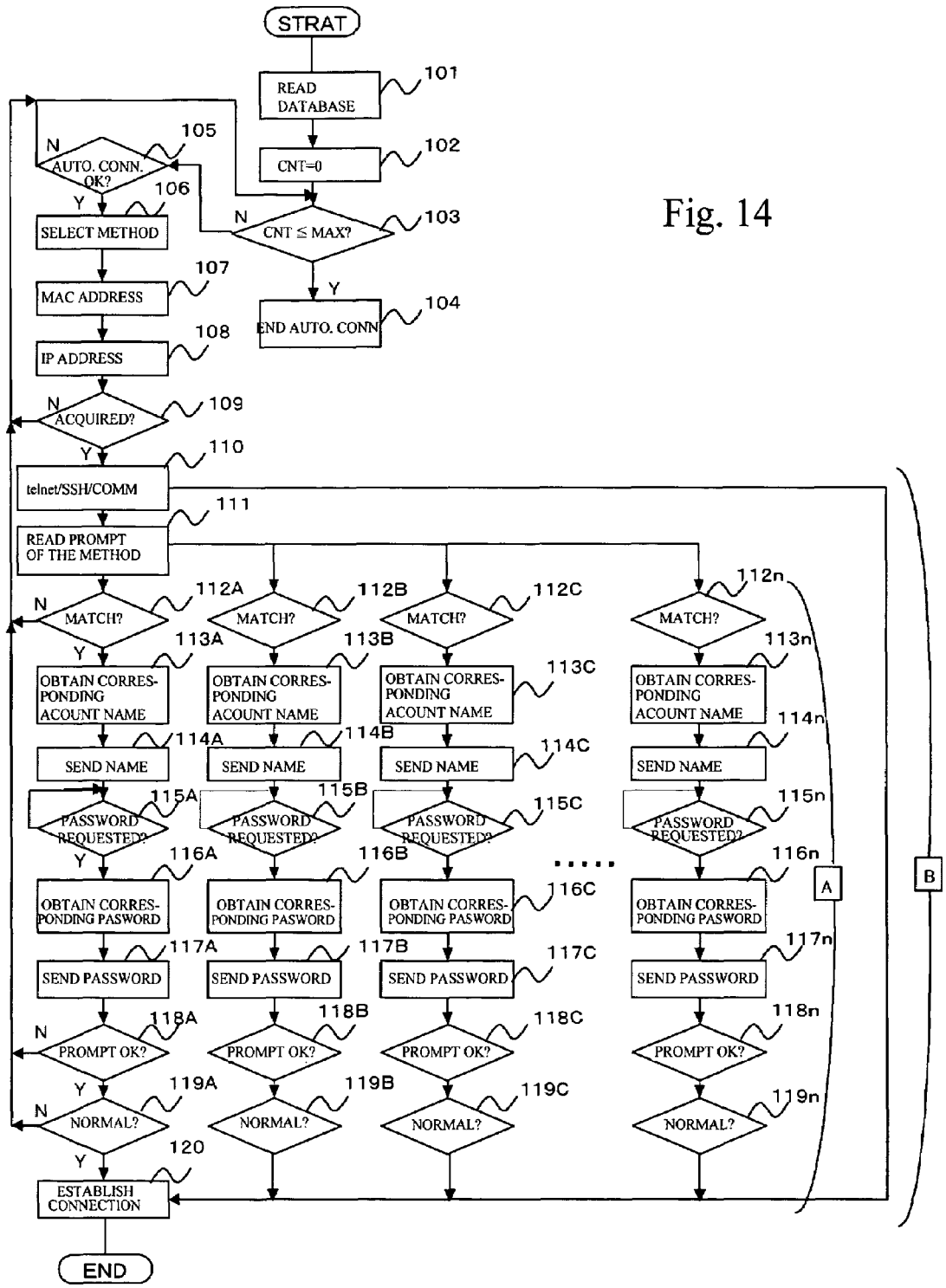
FIG. 14 is a flowchart showing the procedures to be carried out by the console switch to connect to each port of conventional devices.

Referring now to FIG. 14, the procedures to be carried out by the console switch 100 using the database to connect to each port of the conventional devices 200 through 2nn will be described. FIG. 14 is a flowchart showing the procedures to be carried out by the console switch 100 to connect to each port of the conventional devices 200 through 2nn.

In step 101, the CPU 101 of the console switch 100 reads the database that is loaded into the RAM. The following procedures of the console switch 100 are carried out mainly by the CPU 101 in accordance with a predetermined program. In step 102, the console switch 100 initializes the counter number (CNT: the port number), and then starts checking the port numbers in order.

In step 103, the console switch 100 increments the port number in ascending order, and loops the processing until the port number reaches the maximum number. If the port number is the maximum number in step 103, the console switch 100 ends the automatic connecting operation in step 104. If the port number is smaller than the maximum number in step 103, the console switch 100 determines in step 105 whether automatic connection is allowed in accordance with the automatic connecting flag in the database.

If the console switch 100 determines that automatic connection is not allowed in step 105, the operation returns to step 103 to check the next port number. If the console switch 100 determines that automatic connection is allowed in step 105, the operation moves on to step 106 in which the connecting method corresponding to the port number is selected.

Here, a "connecting method" indicates which login procedure to be carried out for the server corresponding to the port number. In this description, Telnet is valid to the device to be connected to, and an account name is outputted in response to the character string "login" at the time of authorization. A password is then outputted in response to the character string "password", and a prompt using the account name is displayed. In this manner, the connecting operation by the connecting method of this embodiment is completed. Note that the character string "login" is merely an example, and it may be "Enter your name?" or bold character string "LOGIN". Likewise, the character string "password" is merely an example, and it may be "Pass?" or simply ":".

The above section of procedures is part of the connecting method, and the block "A" in the flowchart of FIG. 14 represents the same flows of procedures. In FIG. 14, the shortcut indicated as "B" occurs in step 110 when authorization is not necessary in the connecting operation. The types of those procedures are stored in the ROM 109 in advance. The number of flows contained in the block A corresponds to the number of the types of procedures. Note that the procedure of step 106 should be completed only before step 110 is carried out.

In step 107, the console switch 100 extracts the MAC address C7 corresponding to the port number C1 from the database. In step 108, the console switch 100 extracts the IP address C6 corresponding to the MAC address C7, using an ARP command. If the IP address C6 cannot be extracted, the console switch 100 determines in step 109 that there is not the corresponding device connected to the network, and then returns to step 103 to check the next port number.

If the IP address C6 is extracted in step 109, the console switch 100 moves on to step 110. In step 110, a connecting operation using Telnet, SSH (Secure Shell), or COMM, is performed.

In step 111, the console switch reads the prompt of the connecting method. In a case where Telnet is employed as the connecting method, the console switch 100 carries out the procedures of steps S112A through S119A. In a case where SSH is employed as the connecting method, the console switch 100 carries out the procedures of steps S112B through S119B. In a case where COMM is employed as the connecting method, the console switch 100 carries out the procedures of steps S112C through S119C. If a connecting method that is different from any of the above is employed, the console switch 100 carries out the procedures of steps S112n through S119n. In this embodiment, Telnet is employed as the connecting method.

In step 111, the console switch 100 reads the prompt of each connecting method, which is Telnet in this embodiment. If the login prompt cannot be obtained after connection in step 112A, the console switch 100 determines that the connecting method is different or that the connection has failed, and then returns to step 103 to move on to the next port number.

If the login prompt is obtained in step 112A, the console switch 100 extracts the account name C8 corresponding to the port number C1 from the database in the ROM 109 in step 113A. In step 114A, the console switch 100 outputs the account name C8 extracted from the database to the corresponding one of the conventional devices 200 through 2nn.

In step 115A, the console switch 100 waits for a password prompt with respect to the outputted account name. If the password prompt is obtained in step 116A, the console switch 100 outputs the password extracted from the database to the corresponding one of the conventional devices 200 through 2nn in step 117A. If the console switch 100 determines that the command prompt displayed after the extraction of the password is abnormal or an error for a login in step 118A, the operation returns to step 103 to check the next port number C1.

In step 119A, the console switch 100 confirms that the prompt is displayed, and determines that the prompt is normal if the same prompt appears after a press of the enter key. In step 120, the console switch 100 determines that the connection has been established, and then sets "1" to the status column in the database. By doing so, a procedure of skipping each port number C1 having "1" in the status column can be inserted between the step 105 and step 106, when an automatic connecting operation is retried.

If the established connection is cut off, "0" should be set to the status, so that the next automatic connecting operation is performed for the same port number. An automatic connecting operation is a part of the initializing process of the console switch 100. When the terminals 3 through 6 are to be connected to the console switch 100, the automatic connecting operation should already have been completed. The procedures of steps S112B through S119B, steps S112C through S119C, and steps S112n through S119n, are the same as those of steps S112A through S119A, and therefore, explanation of them is omitted herein.

Figure 15:
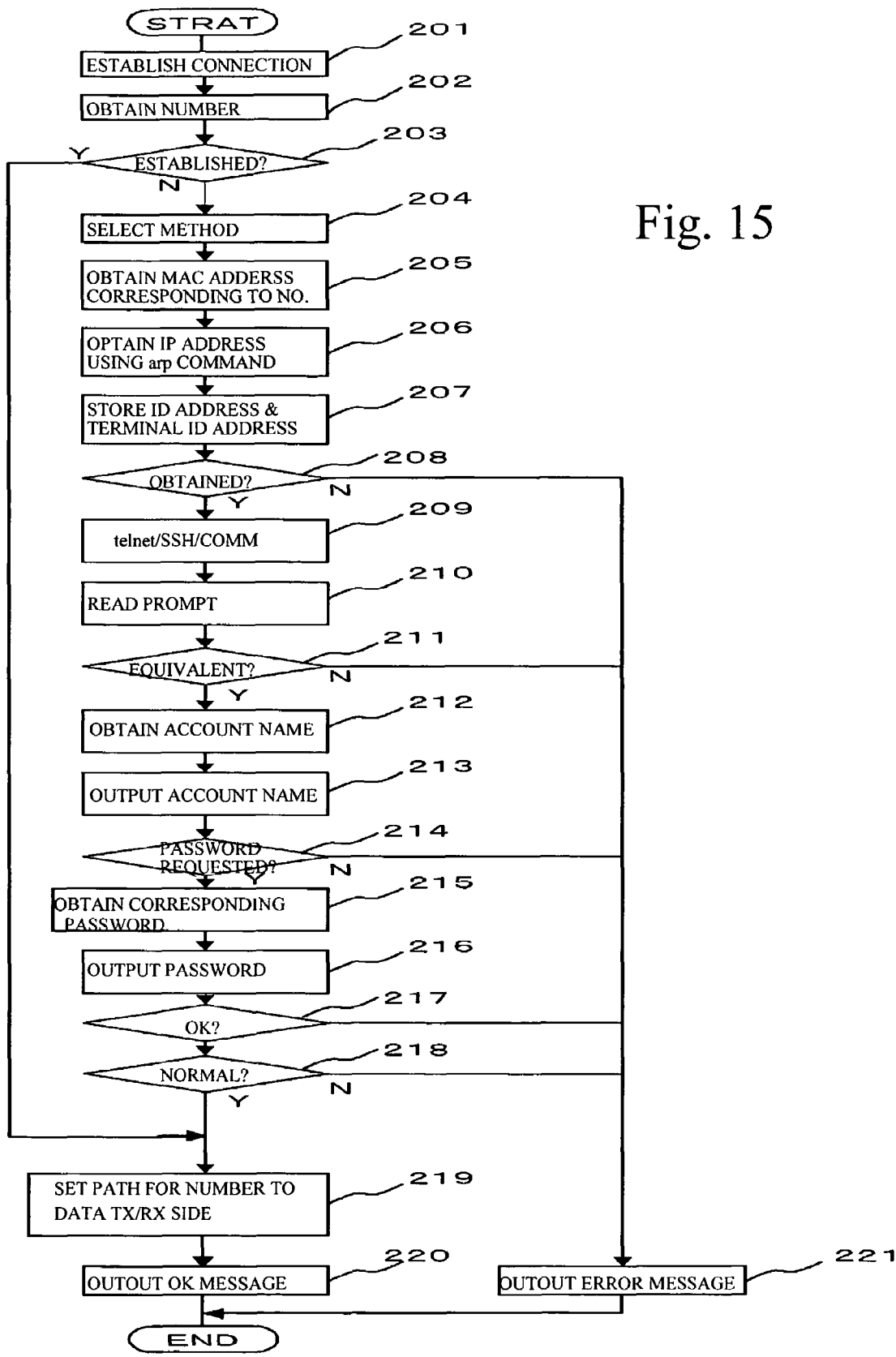
FIG. 15 is a flowchart showing the procedures to be carried out by a terminal and the console switch when the terminal completes a connection to a port of the conventional devices.

Next, the procedures to be carried out by a terminal and a console switch to complete the connection of the terminal to each port of a conventional device represented by port numbers or port names will be described. In the following description, the terminal 3 shown in FIG. 9 is to connect to the console switch 100, so as to connect to the server T0032 connected to the conventional device 201 to which the console switch 100 has automatically connected, and so as to connect to the server T0121 connected to a conventional device to which the console switch 100 has failed to automatically connect. These procedures will be described below, with reference to the flowchart of FIG. 15 and the terminal screens shown in FIGS. 16 through 21.

In step 201, so as to connect to the server T0032, the terminal 3 connects to the console switch 100. As shown in FIG. 16, Windows (a registered trademark) XP is operating in the terminal 3, and Telnet is to be executed in accordance with a Telnet program that is part of the default setting of Windows XP. Although Windows is used as the OS in this embodiment, some other OS may be employed instead of Windows. The IP address of the terminal 3 is "10.0.0.2".

In step 201, the terminal 3 connects to the console switch 100, using the IP address "10.0.0.1" of the console switch 100, as shown in FIG. 16. Since the terminal 3 has not yet logged in with the console switch 100 at this point, the screen of the terminal 3 becomes as shown in FIG. 17. The login name and password are inputted in the terminal 3, so that the terminal 3 properly connects to the console switch 100. FIG. 18 shows the screen of the terminal 3 at this point.

After detecting the connection with the terminal 3, the console switch 100 prompts the operator to enter port information such as a port number ("Server No.") or a port name ("Name"), as shown in FIG. 18. When the port number "0032" is inputted in the terminal 3, as shown in FIG. 19, the console switch 100 receives the port number "0032" in step 202 in FIG. 15. The record with respect to the port number "0032" stored in the database is shown in FIG. 22.

FIG. 22 shows the record with respect to the port number "0032" stored in the database. As the third column from the last, which indicates the status C10, is "1" in this record of information, a connection has already been established. Accordingly, in step 203, the console switch 100 determines that the connection has already been established. The console switch 100 then moves on to step 219, and reconstructs the connection path as shown in FIG. 20. In step 220, the console switch 100 outputs a message to notify the terminal 3 that the connection has already been established.

Next, an example case where a connection is to be established with a server connected to a port having the record specified below and the port number "0011", not "0032", will be described. FIG. 23 shows the record with respect to the port number "0011" stored in the database. Since the third column from the last, which indicates the status C1, is "0", a connection has not yet been established, unlike the case of the port number "0032". Therefore, the terminal IP address C11 and the connecting port number C12 are blank, as shown in FIG. 23. Accordingly, in step 203, the console switch 100 determines that the connection has not yet been established, and moves on to step 204.

In step 204, the console switch 100 detects a connecting method. In step 205, the console switch 100 obtains the MAC address (C7) of the conventional device 200 in accordance with the port number "0011" (C1). In step 206, the console switch 100 detects the IP address (C6) in accordance with the obtained MAC address (C7), using an ARP command. In step 207, the console switch 100 stores the detected IP address (C6) of the conventional device 200 and the terminal IP address (C11) in the database. If the IP address is obtained in step 208, the console switch 100 moves on to step 209. If the IP address cannot be obtained in step 208, the console switch 100 moves on to step 221 to output an error message.

In step 209, the console switch 100 executes Telnet with respect to the IP address of the conventional device 200. In step 210, the console switch 100 identifies the prompt of the connecting method. If the read prompt is determined to be equivalent to the login prompt in step 211, the console switch 100 extracts the account name corresponding to the number from the database in step 212.

In step 213, the console switch 100 outputs the account name to the conventional device 200. If a password prompt appears in step 214, the console switch 100 extracts the password corresponding to the number from the database in step 215. In step 216, the console switch 100 outputs the password to the conventional device 200.

After the password is accepted in step 217, and a proper prompt for the account is displayed in step 218, the console switch 100 writes the connection path information in the database in step 219. In step 220, the console switch 100 outputs a message to notify the terminal 3 of the new connection, as shown in FIG. 21.

After outputting the information shown in FIGS. 19 and 21 to the terminal 3, the console switch 100 stores transmission and reception data generated between the terminal 3 and the serial ports of the conventional devices 200 through 2nn in the auxiliary memory device 111, as well as messages outputted from the console switch 100 to the screens of the terminals 3 through 6, such as the message "Select 32. already auto connected" shown in FIG. 20.

Among the contents to be recorded in the auxiliary memory device 111, the records of the items displayed on the screens of the terminals 3 through 6 are stored separately from transaction records of transmission and reception. The former is referred to as logs, while the latter is referred to as raw data. The raw data are formed by directly recording transmission and reception data generated between the terminals 3 through 6 and the serial ports, and, in later stages, are used to reproduce transactions between the terminals 3 through 6 and the serial ports of the conventional devices 200 through 2nn.

The logs are simply the results, and therefore, are useful for investigating what kinds of data have been transmitted and received. Here, the transmission data and the reception data may be stored separately from each other in the auxiliary memory device 111. The data stored in the auxiliary memory device 111 can be used for reference in later stages.

In a case where the auxiliary memory device 111 is a removable medium such as Compact Flash (a registered trademark), the removable medium can be removed from the console switch 100, and a personal computer with a removable media slot can refer to the data stored in the removable medium.

The console switch 100 automatically connects to the serial ports of the conventional devices 200 through 2nn. By doing so, if there are no terminals to display, the console switch 100 can operate in place of the terminal 3 through 6. Data generated from the console switch 100 with respect to the automatically connected serial ports of the conventional devices 200 through 2nn are not the account names and the passwords used for the automatic connections, but data outputted from the serial ports.

The console switch 100 stores the above data as logs in the auxiliary memory device 111, regardless of whether the terminals 3 through 6 connect to the console switch 100. Furthermore, account names and passwords are not necessary for automatic connections, and the serial ports may be set as the output destinations of the console switch 100. The console switch 100 recognizes those conditions in accordance with the connecting method, and also records output-only data also as logs in the auxiliary memory device 111. If input streams from the terminals 3 through 6 become hindrance to the recording of the logs, the input streams should be eliminated. The console switch 100 may also record the data of all the automatically connected serial ports in the auxiliary memory device 111.

Figure 24:
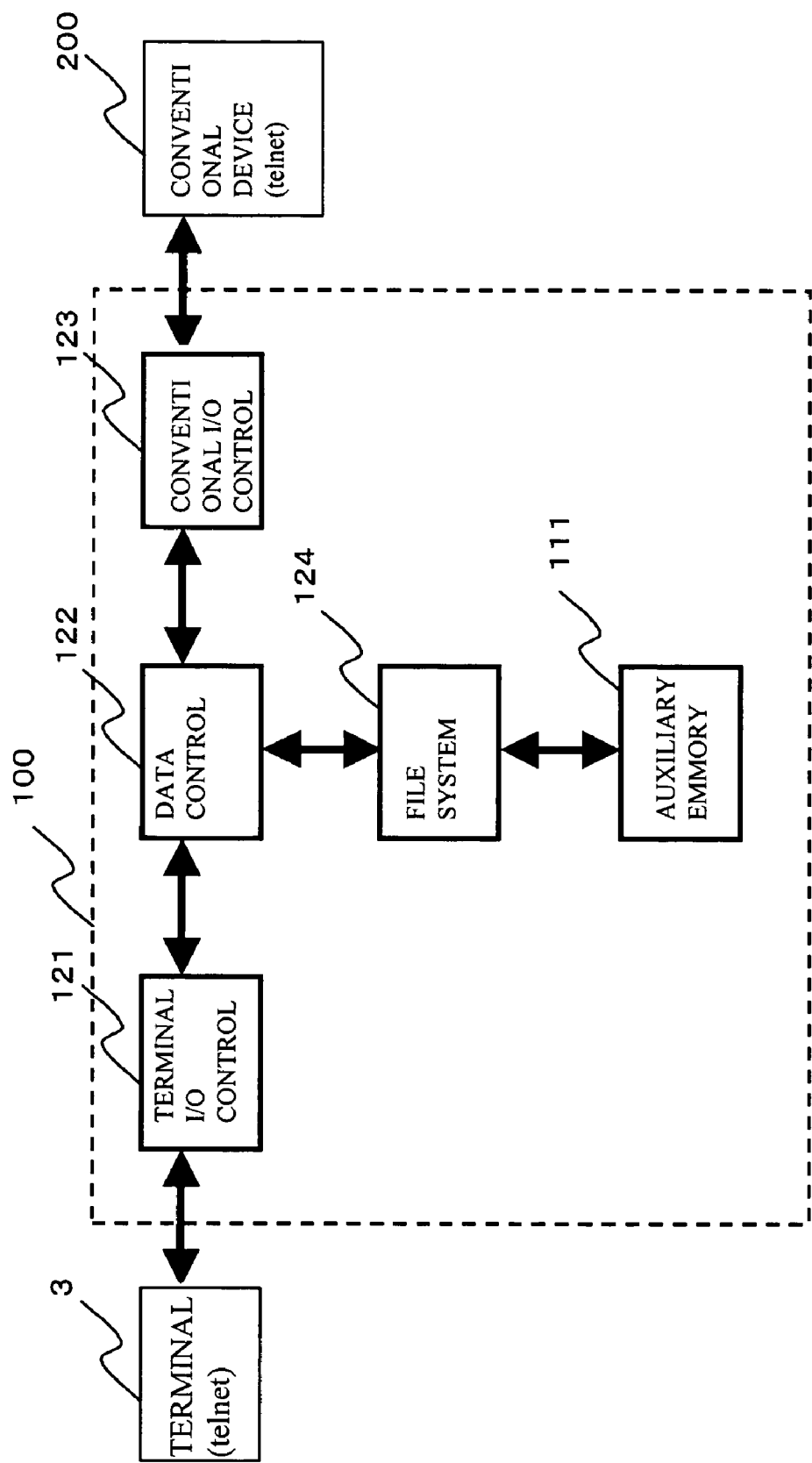
FIG. 24 illustrates an operation of recording data in the auxiliary memory device.
Figure 25:
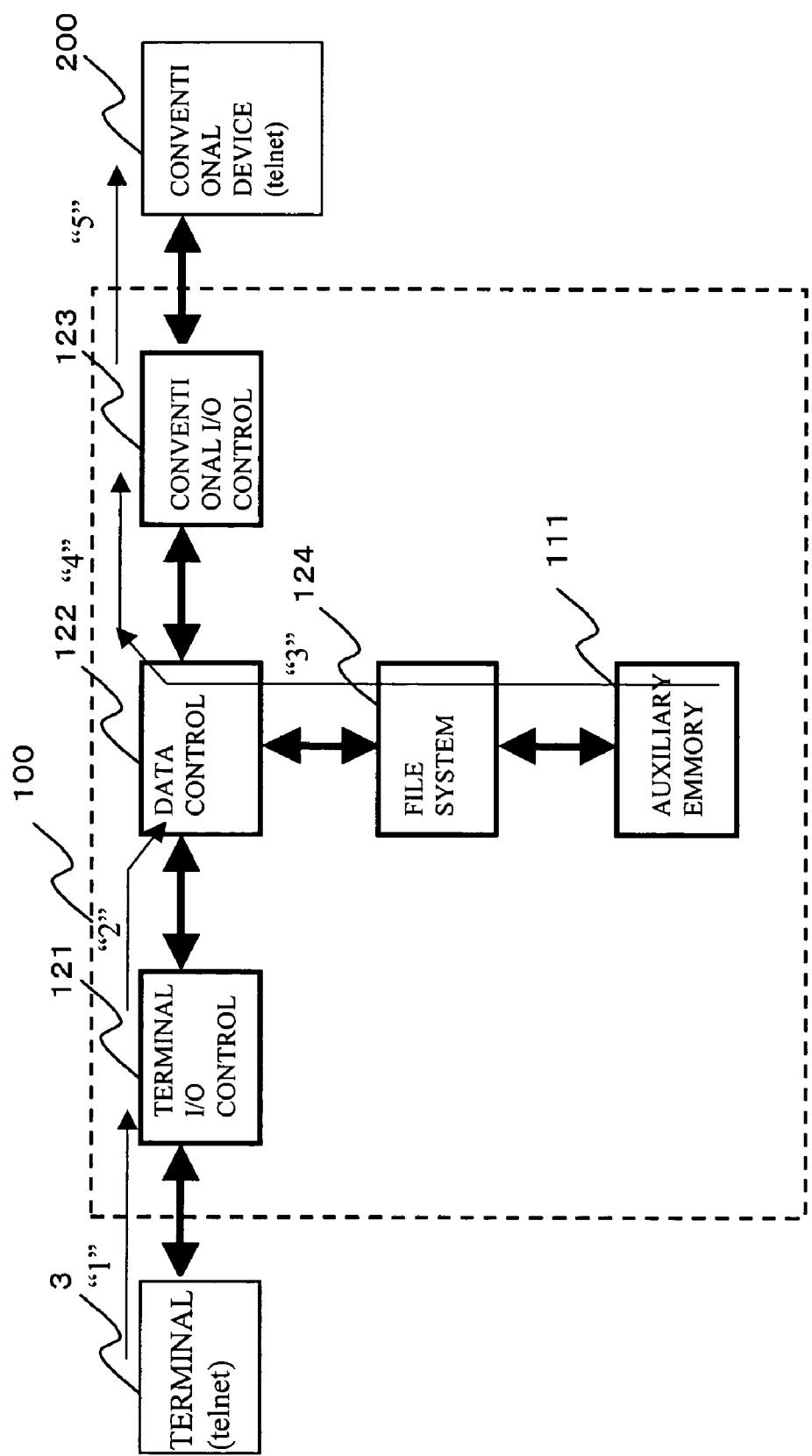
FIG. 25 shows a flow of data that are transmitted from a terminal, are recorded in the auxiliary memory device, and are finally outputted to a conventional device.
Figure 26:
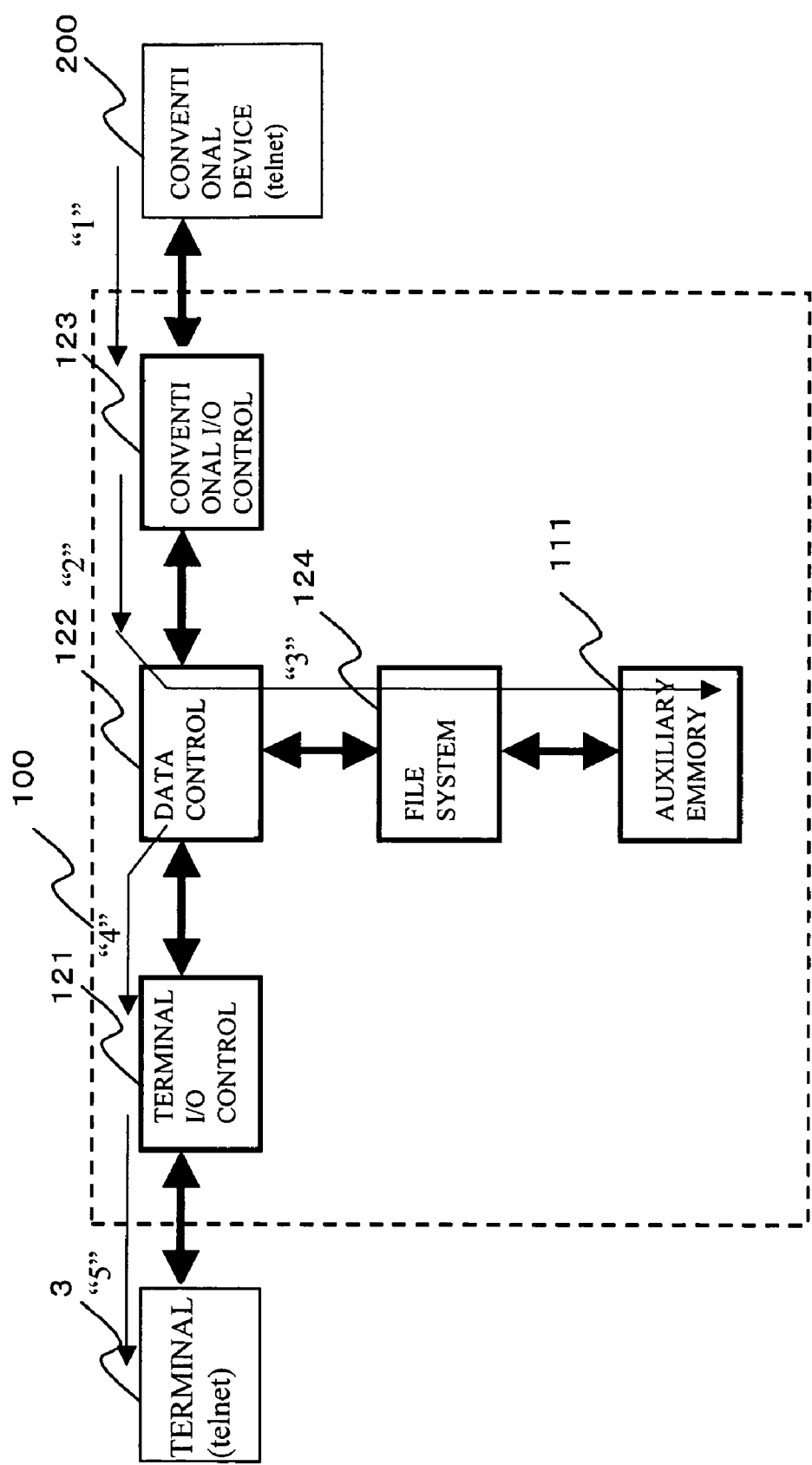
FIG. 26 shows a flow of data that are transmitted from a conventional device, are recorded in the auxiliary memory device, and are finally outputted to a terminal.

Referring now to FIGS. 24 through 26, an operation of the console switch 100 to record data in the auxiliary memory device 111 will be described. FIG. 24 illustrates the operation of recording data in the auxiliary memory device 111. As shown in FIG. 24, the console switch 100 includes a terminal I/O control unit 121, a data control unit 122, a conventional device I/O control unit 123, a file system 124, and the auxiliary memory device 111. The terminal 3 and the conventional device 200 are interfaced through the network with Telnet.

The console switch 100 stores data generated from the Telnet interface in the auxiliary memory device 111 in accordance with a running program. The terminal I/O control unit 121 relays operations between the terminal 3 and the data control unit 122. After receiving data from the terminal 3, the terminal I/O control unit 121 relays the received data to the data control unit 122. The terminal I/O control unit 121 also relays data from the data control unit 122 to the terminal 3.

The conventional device I/O control unit 123 relays operations between the conventional device 200 and the data control unit 122. Upon receipt of data from the conventional device 200, the conventional device I/O control unit 123 relays the received data to the data control unit 122. The conventional device I/O control unit 123 also relays data from the data control unit 122 to the conventional device 200.

The data control unit 122 interacts with the file system 124, and creates a log file and adds the log file to the auxiliary memory device 111. The file system 124 is a general file system, and manages the files in the auxiliary memory device 111. The auxiliary memory device 111 is a storage device that can be recognized by the file system, and may be an IDE (Integrated Device Electronics) disk, for example.

Referring now to FIG. 25, a flow of data that are outputted from the terminal 3 to the console switch 100, are then stored in the auxiliary memory device 111, and are finally outputted to the conventional device 200 will be described. FIG. 25 shows the flow of data that are outputted from the terminal 3 to the console switch 100, and are then recorded in the auxiliary memory device 111, and are finally outputted to the conventional device 200. As shown in FIG. 25, data that are outputted from the terminal 3 are first inputted to the terminal I/O control unit 121 of the console switch 100 through a Telnet interface ("1" in FIG. 25).

The terminal I/O control unit 121 relays the data inputted from the terminal 3 to the data control unit 122 ("2" in FIG. 25). The data control unit 122 in turn relays the received data to the conventional I/O control unit 123 ("4" in FIG. 25), and then checks the data. If there are data worth recording, the data control unit 122 records the data in the auxiliary memory device 111 through the file system 124 ("3" in FIG. 25). The conventional device I/O control unit 123 further relays the data received from the data control unit 122 to the conventional device 200 through a Telnet interface ("5" in FIG. 25).

Referring now to FIG. 26, a flow of data that are outputted from the conventional device 200 to the console switch 100, are then recorded in the auxiliary memory device 111, and are finally outputted to the terminal 3 will be described. FIG. 26 shows the flow of data that are outputted from the conventional device 200 to the console switch 100, are then recorded in the auxiliary memory device 111, and are finally outputted to the terminal 3. Data that are outputted from the conventional device 200 are first inputted to the conventional device I/O control unit 123 of the console switch 100 through a Telnet interface ("1" in FIG. 26).

The conventional device I/O control unit 123 relays the data to the data control unit 122 ("2" in FIG. 26). The data control unit 122 relays the received data to the terminal I/O control unit 121 ("4" in FIG. 26), and then checks the data. If there are data worth recording, the data control unit 122 records the data in the auxiliary memory device 111 through the file system 124 ("3" in FIG. 26). The terminal I/O control unit 121 relays the received data to the terminal 3 through a Telnet interface ("5" in FIG. 26).

Figure 27:
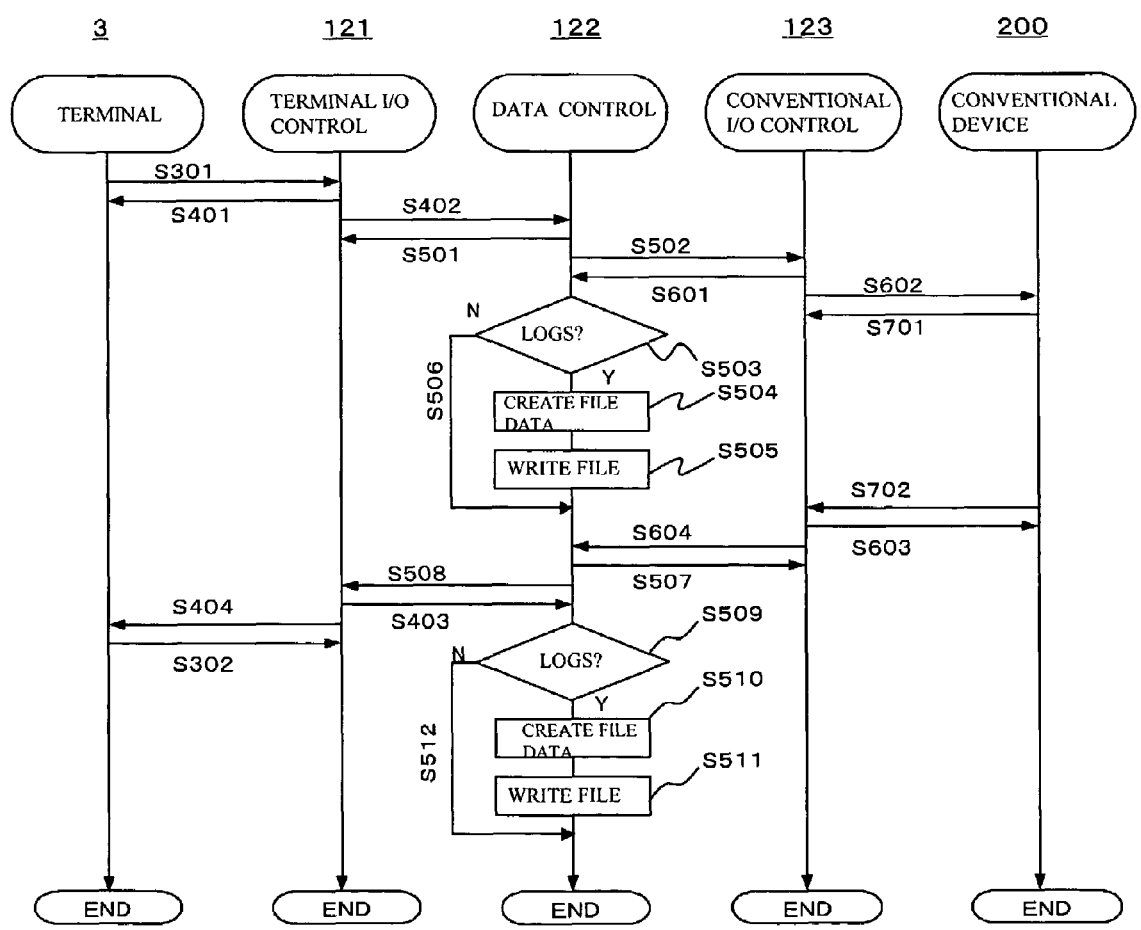
FIG. 27 is a flowchart showing flows of data between a terminal and a conventional device.

Referring now to FIG. 27, the above operations described in conjunction with FIGS. 24 through 26 will be described in greater detail. FIG. 27 is a flowchart showing flows of data between the terminal 3 and the conventional device 200. These flows show that data outputted from the terminal 3 are accumulated as logs in the auxiliary memory device 111 by the data control unit 122, regardless of whether the data generated from the terminal 3 are to be relayed to the conventional device 200. These flows also show that data outputted from the conventional device 200 are accumulated as logs in the auxiliary memory device 111 by the data control unit 122, regardless of whether the data generated from the conventional device 200 are to be relayed to the terminal 3.

In the following manner, the console switch 100 records data outputted from both the conventional device 200 and the terminal 3 in the auxiliary memory device 111.

As shown in FIG. 27, when data are outputted from the terminal 3 (S301), a notification is sent to the terminal I/O control unit 121. The terminal I/O control unit 121 then responds to the terminal 3 (S401). The terminal I/O control unit 121 outputs the data to the data control unit 122 (S402), and then receives a response from the data control unit 122 (S501). The data control unit 122 outputs the received data to the conventional device I/O control unit 123 (S502), and then receives a response from the conventional device I/O control unit 123 (S601).

The data control unit 122 examines whether the received data are to be accumulated as logs (S503). If the received data are to be accumulated as logs, the data control unit 121 creates a file to store the received data as file data in the auxiliary memory device 111 (S504), and writes the file into the auxiliary memory device 111 (S505).

Meanwhile, if the received data are not to be accumulated as logs, the data control unit 122 does not carry out any procedure (S506). The conventional device I/O control unit 123 transmits the received data to the conventional device 200 (S602), and receives a response from the conventional device 200 (S701). The conventional device 200 then operates in accordance with the received data.

The above order of procedures can be reversed. When data are received from the terminal 3, or when data are to be spontaneously transmitted from the conventional device 200, the conventional device 200 outputs the data to the conventional device I/O control unit 123 (S702). The conventional device I/O control unit 123 then responds to the conventional device 200 (S603). Having received the data, the conventional device I/O control unit 123 transmits the data to the data control unit 122 (S604). The data control unit 122 then responds to the conventional device I/O control unit 123 (S507).

Having received the data, the data control unit 122 outputs the data to the terminal I/O control unit 121 (S508). The terminal I/O control unit 121 then responds to the data control unit 122 (S403). While the terminal I/O control unit 121 outputs the data to the terminal 3 (S404), the data control unit 122 examines whether the received data are to be accumulated as logs (S509).

If the received data are to be accumulated as logs, the data control unit 122 creates a file to store the received data as file data in the auxiliary memory device 111 (S510), and writes the file into the auxiliary memory device 111 (S511). Meanwhile, if the received data are not to be accumulated as logs, the data control unit 122 does not perform any procedure (S512).

The terminal I/O control unit 121 transmits the received data to the terminal 3 (S404), and then receives a response from the terminal 3 (S302). The terminal 3 then operates in accordance with the received data.

As described so far, in accordance with this embodiment, the console switch 100, which selectively connects the terminals 3 through 6 to each port of the conventional devices 200 through 2*nn* each having two or more ports connected through a network, first obtains port information for specifying each desired port from the terminals 3 through 6. Based on the obtained port information, the console switch 100 refers to the database, and establishes connection paths between the terminals 3 through 6 and the ports of the conventional devices 200 through 2*nn*. Even if the terminals 3 through 6 do not hold information such as the IP addresses of the conventional devices 200 through 2*nn*, the terminals 3 through 6 can easily connect to each port of any of the conventional devices 200 through 2*nn* by designating the port information of the desired one of the conventional devices 200 through 2*nn*.

Second Embodiment

Figure 28:
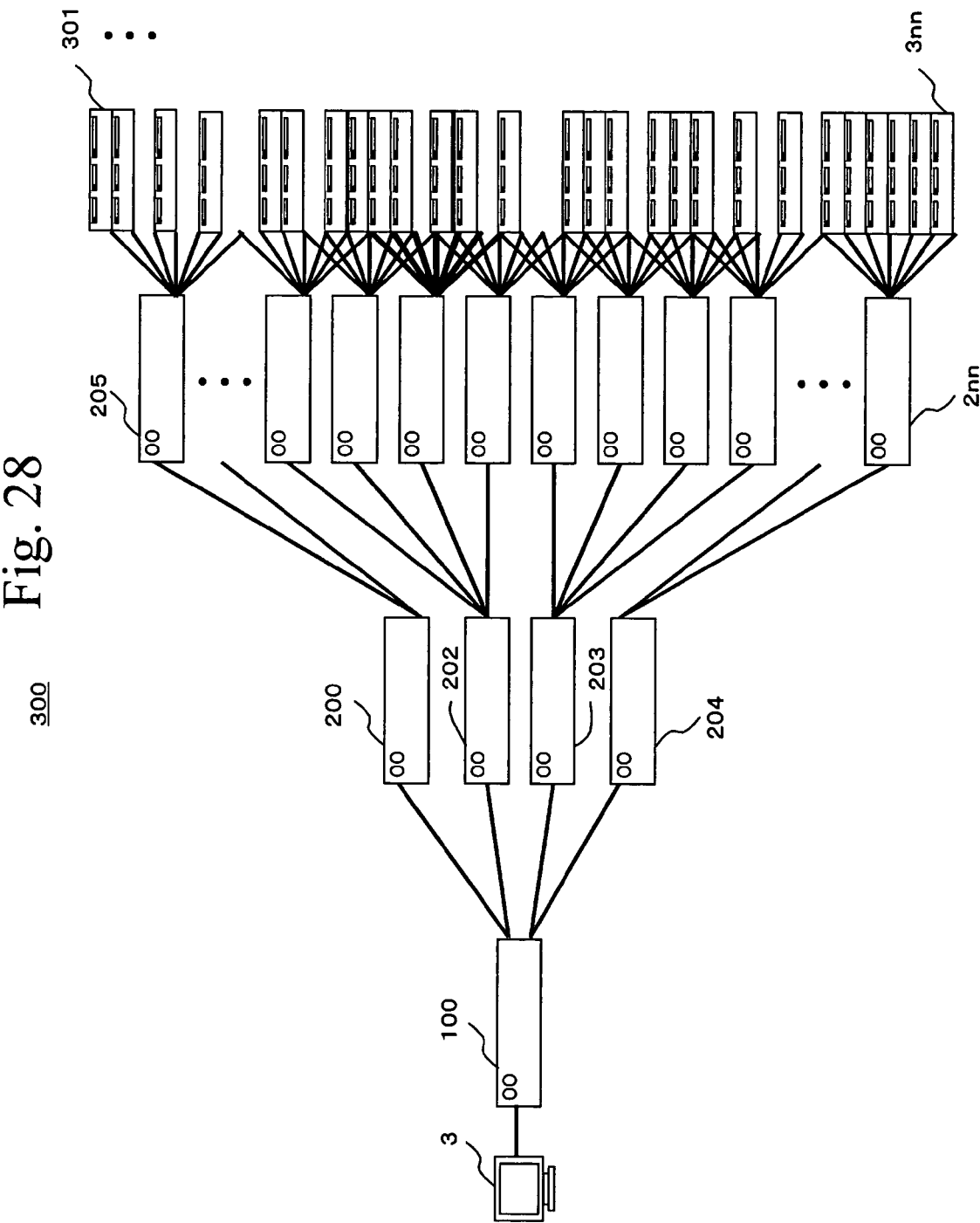
FIG. 28 illustrates a system in accordance with a second embodiment of the present invention.

A second embodiment of the present invention will be next described. The second embodiment differs from the first embodiment in which conventional devices are cascade-connected to the console switch 100. FIG. 28 illustrates a system in accordance with the second embodiment.

As shown in FIG. 28, a system 300 includes the console switch 100, the conventional devices 200 through 2*nn*, a number of servers 301 through 3*nn*, and the terminal 3. In this system 300, the terminal 3 is connected to the console switch 100. The conventional devices 200 through 2*nn* are cascade-connected to the console switch 100. The servers 301 through 3*nn* are connected to the conventional devices 205 through 2*nn*.

In accordance with this embodiment, the conventional devices 200 through 2*nn* each having ports are cascade-connected to the console switch 100. Accordingly, the terminal 3 can arbitrarily designate a larger number of ports than in the first embodiment. FIG. 28 shows merely an example of cascade connection of the conventional devices 200 through 2*nn*, and the conventional devices 200 through 2*nn* may be cascade-connected in a different manner.

Third Embodiment

Figure 29:
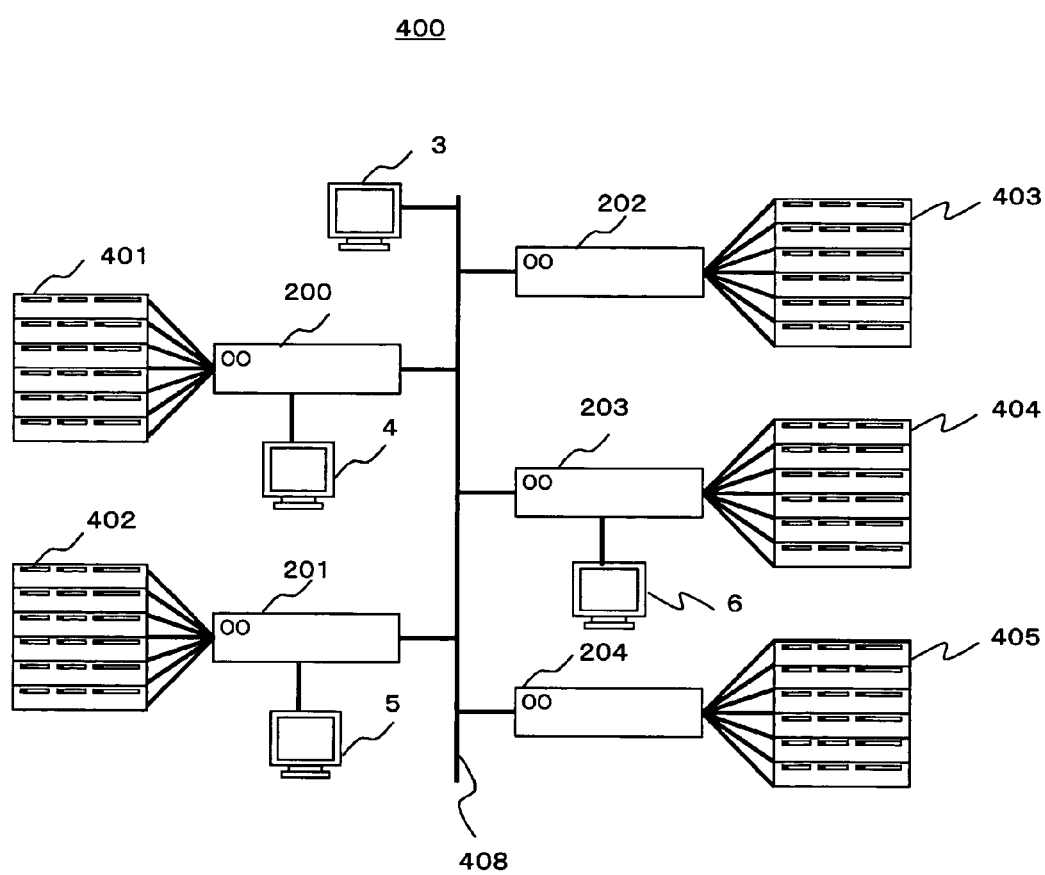
FIG. 29 illustrates an example of a conventional bus-connected system.
Figure 30:
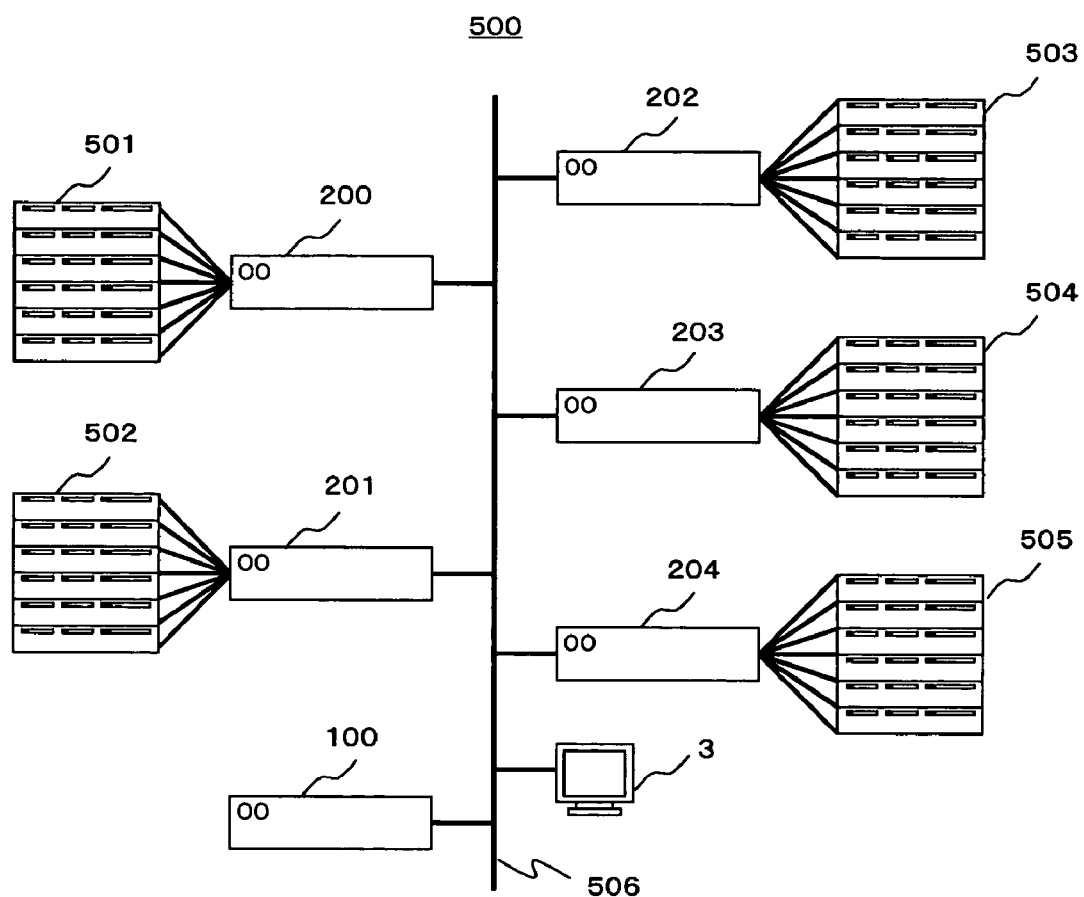
FIG. 30 illustrates a system in accordance with a third embodiment of the present invention.

A third embodiment of the present invention will now be described. The third embodiment differs from the first embodiment in that a console switch is bus-connected to the system of the first embodiment. FIG. 29 illustrates an example of a conventional bus-connected system. FIG. 30 illustrates a system in accordance with the third embodiment.

As shown in FIG. 29, a conventional system 400 includes the conventional devices 200 through 204, server groups 401 through 405, and the terminals 3 through 6. The conventional devices 200 through 204 are bus-connected to a maintenance LAN 408. Such type of connection is often found in environments requiring network connections, such as a data center.

In the example shown in FIG. 29, the five conventional devices 200 through 204 exist, and the terminals 3 through 6 perform operations for the five respective conventional devices 200 through 204. In other words, so as to connect to the server groups 401 through 405, the terminals 3 through 6 need to connect to each of the conventional devices 200 through 204.

FIG. 30 illustrates a system that has the console switch 100 of the first embodiment connected to the system 400 of FIG. 29. As shown in FIG. 30, a system 500 includes the console switch 100, the conventional devices 200 through 204, the server groups 501 through 505, and the terminal 3. In this system 500, the console switch 100 is bus-connected to a maintenance LAN 506.

As the console switch 100 is bus-connected to a network in this manner, the terminal 3 needs to access only the console switch 100, and operators do not have to bother with the details of the network connections among the five conventional devices 200 through 204. Accordingly, operators can control all the server groups 501 through 505 through the terminal 3.

Fourth Embodiment

Figure 31:
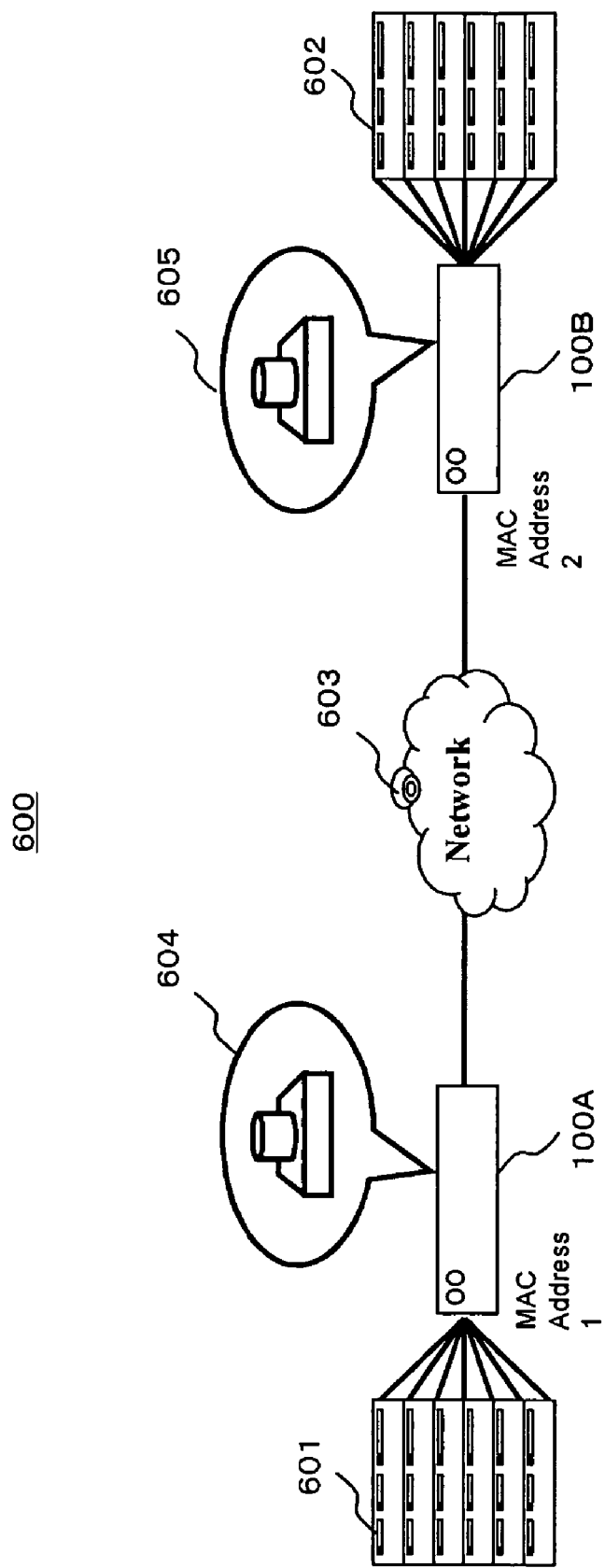
FIG. 31 illustrates a system in accordance with a fourth embodiment of the present invention.

A fourth embodiment of the present invention will now be described. The fourth embodiment differs from the first embodiment in that two console switches of the first embodiment are connected to each other, with a network being interposed between the two console switches. FIG. 31 illustrates a system in accordance with the fourth embodiment. This embodiment employs a face-to-face connecting method for extending serial ports.

As shown in FIG. 31, a system 600 includes two console switches 100A and 100B, server groups 601 and 602 that are connected to the console switches 100A and 100B, respectively, and a network 603. Each of the console switches 100A and 100B is the same as the console switch 100 of the first embodiment.

The console switches 100A and 100B are connected to each other through the network 603. The console switches 100A and 100B have tuning buttons 604 and 605, respectively, for exchanging port information with each other.

In accordance with this embodiment, the network 603 is infinitely extended, so that extended serial ports can be utilized. Data transmission and reception between the console switches 100A and 100B should interactively performed by a data handshake using TCP/IP, for example. Therefore, various types of data transmission and reception can be performed, as long as data can be transmitted and received. In this embodiment, the network 603 involves the data transmission and reception.

With the above mentioned face-to-face connection, serial port data can be exchanged between the two console switches 100A and 100B. Each of the two console switches 100A and 100B has the same number of serial ports. With the face-to-face connection, the serial ports of the console switch 100A can face the corresponding serial ports of the console switch 100B. For instance, the serial port No. 1 of the console switch 100A is connected to the serial port No. 1 of the other console switch 100B. Even if the console switch 100A has a different number of serial ports from the console switch 100B, the matching should be made among the serial ports with smaller numbers.

Figure 32:
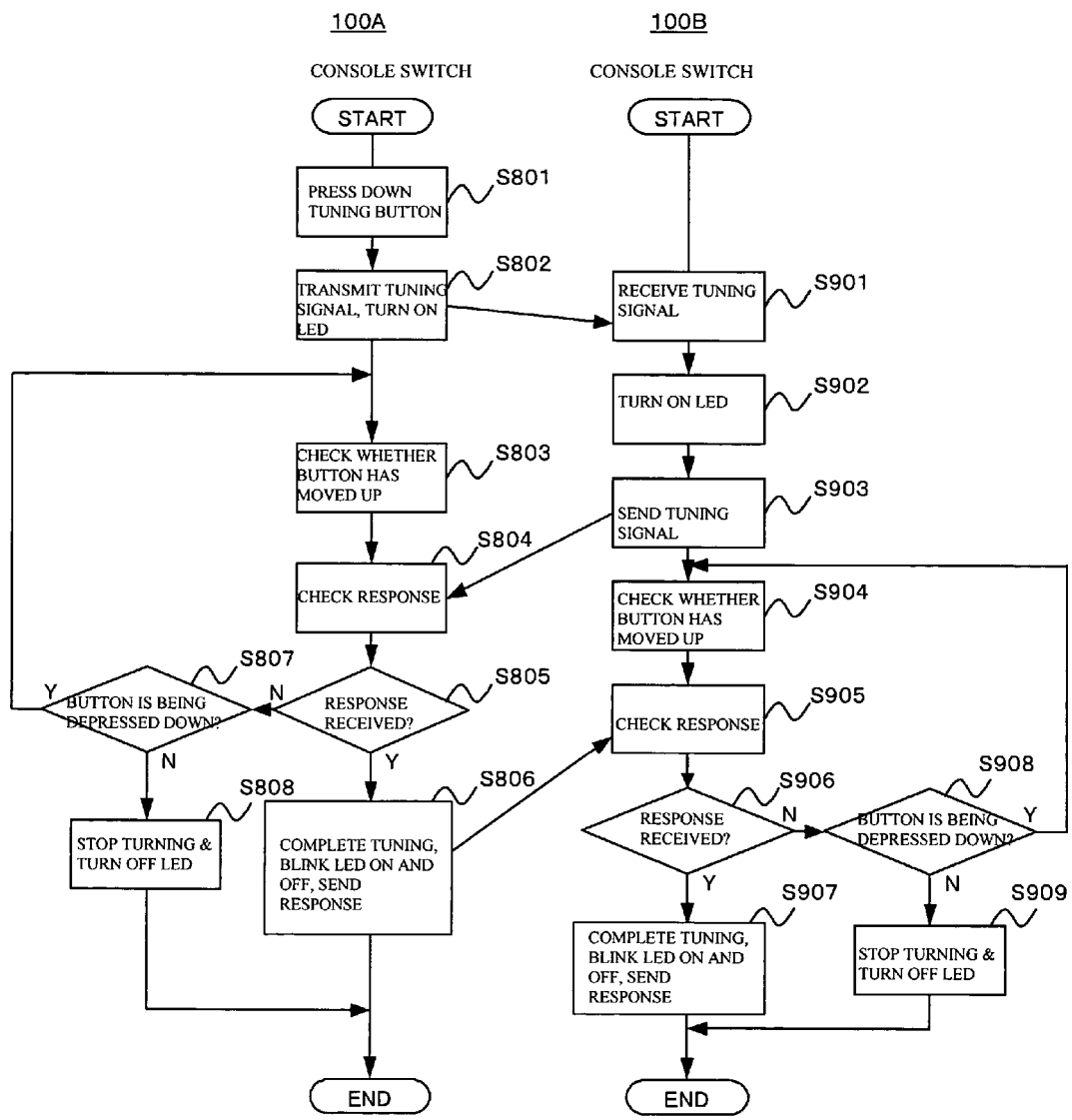
FIG. 32 is a flowchart showing the operation of the system in accordance with the fourth embodiment.

Referring now to FIG. 32, the operation of the system 600 will be described. FIG. 32 is a flowchart showing the operation of the system 600. In the example shown in FIG. 32, the tuning button 604 of the console switch 100A is pressed before the tuning button 605 of the console switch 100B.

In step S801, the tuning button 604 of the console switch 100A is pressed down. In step S802, the console switch 100A transmits a tuning signal to the console switch 100B, and turns on a LED provided in the console switch 100A. In step S803, the console switch 100A determines whether the tuning button 604 has moved up and returned to the original position.

In step S804, the console switch 100A checks a response from the console switch 100B. If the console switch 100A determines that there is a response from the console switch 100B in step S805, the console switch 100A moves on to step S806. In step S806, the console switch 100A completes the tuning with the console switch 100B, blinks the LED on and off, transmits a response to notify the console switch 100B that the tuning has been completed, and then ends the operation.

Meanwhile, if the console switch 100A determines that there is not a response from the console switch 100B in step S805, the console switch 100A moves on to step S807. In step S807, the console switch 100A determines whether the tuning button 604 is being pressed down, and if so, returns to step S803. If the console switch 100A determines that the tuning button 604 is not being pressed down in step S807, the console switch 100A moves on to step S808. In step S808, the console switch 100A stops the tuning with the console switch 100B, turns off the LED, and ends the operation.

In step S901, the console switch 100B receives a tuning signal from the console switch 100A. In step S902, the console switch 100B turns on a LED provided therein. In step S903, the console switch 100B transmits a tuning signal to the console switch 100A. In step S904, the console switch 100B determines whether the tuning button 605 has moved up and returned to the original position.

In step S905, the console switch 100B checks a response from the console switch 100A. If the console switch 100B receives a response from the console switch 100A in step S906, the console switch 100B moves on to step S907. In step S907, the console switch 100B completes the tuning with the console switch 100A, blinks the LED on and off, and then ends the operation.

Meanwhile, if the console switch 100B determines that there is not a response from the console switch 100A in step S906, the console switch 100B moves on to step S908. In step S908, the console switch 100B determines whether the tuning button 605 is being pressed down, and if so, the console switch 100B returns to step S904. If the console switch 100B determines that the tuning button 605 is not being pressed down in step S908, the console switch 100B moves on to step S909. In step S909, the console switch 100B stops the tuning with the console switch 100A, turns off the LED, and then ends the operation. Through the above procedures, harmonization of port information can be achieved between the console switches 100A and 100B.

In accordance with this embodiment, serial port data are interactively exchanged between two devices. Thus, the console switches 100A and 100B can identify and recognize each other.

Fifth Embodiment

A fifth embodiment of the present invention will now be described. The fifth embodiment differs from the first embodiment in that the console switch 100 is replaced with another structure. In the first embodiment, terminals are connected to a network (a hub) that is inherent to the console switch 100. A console switch 100C of this embodiment, however, can be applied to a case where conventional devices, the console switch 100C, and terminals, are all connected to the same network.

Figure 33:
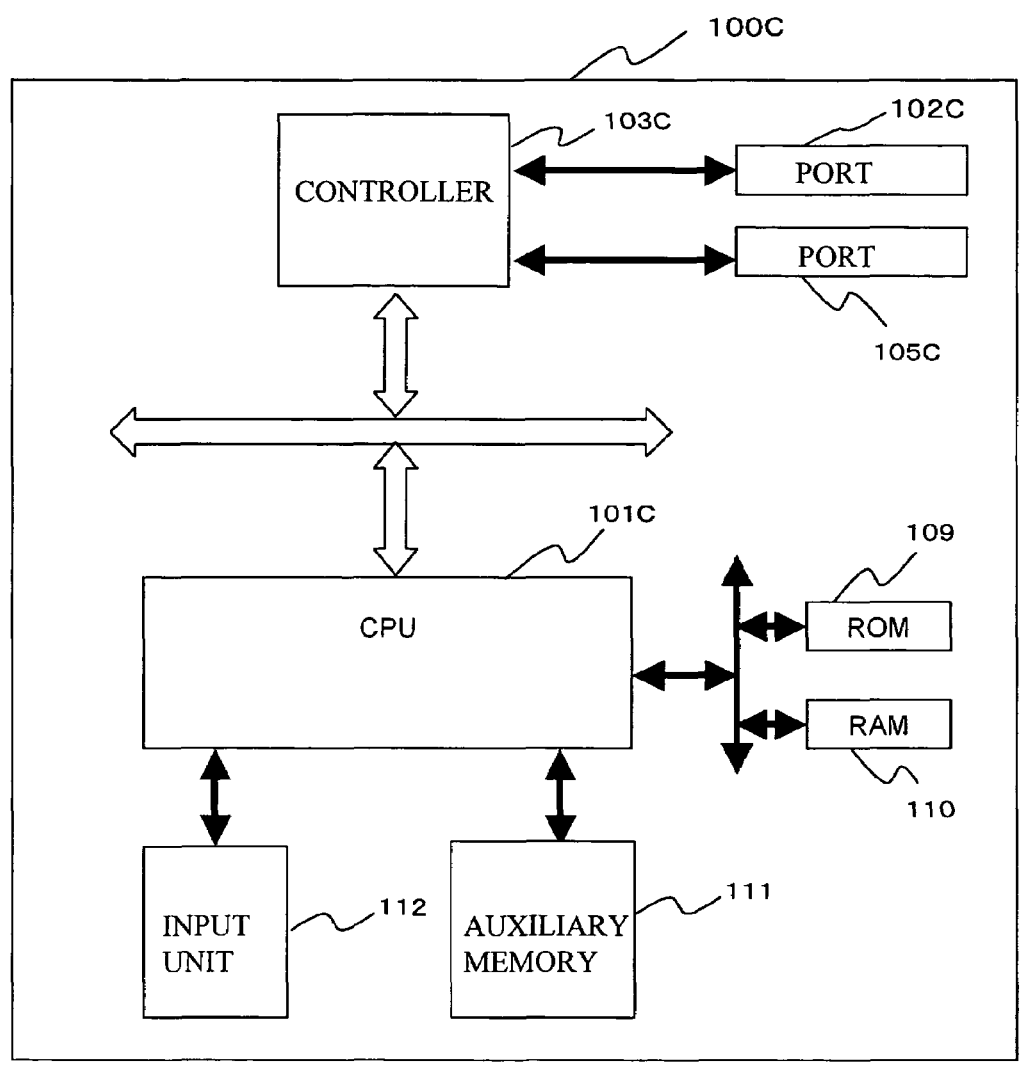
FIG. 33 illustrates a console switch in accordance with a fifth embodiment of the present invention.

FIG. 33 illustrates the console switch 100C in accordance with the fifth embodiment. In FIG. 33, the same components as those in FIG. 10 are denoted by the same reference numerals as the corresponding ones in FIG. 10, and explanation of them is omitted herein. As shown in FIG. 33, the console switch 100C includes a CPU 101C, a conventional device port 102C, a controller 103C, a terminal port 105C, a ROM 109, a RAM 110, an auxiliary memory unit 111, and an input unit 112.

The conventional device port 102C includes a connector for connecting to a LAN. The terminal port 105C also includes a connector for connecting to the LAN. The controller 103C serves as interfaces with the conventional device port 102C and the terminal port 105C. Unlike the console switch 100 shown in FIG. 10, the console switch 100C does not have a built-in hub controller, and the controller 103C functions as the interfaces with terminals and conventional devices.

The CPU 101C controls the entire console switch 100C. The CPU 101C is bus-connected to the controller 103C, and control is performed through the CPU 101.

Specific examples of console switches have been described in the first through fifth embodiments. However, console switches in accordance with the present invention are not limited to those examples.

In accordance with any of the above described embodiments, after connecting to the console switch 100 through Telnet, a terminal can connect to a desired server using only the port information including the port number or the port name. Therefore, a terminal does not need to obtain information such as the IP address and the serial port number corresponding to the desired server among the conventional devices 200 through 2nn. There is no need to constantly check the relationships among a large number of ID addresses and an even larger number of serial ports. Accordingly, console switching can be done by a simple operation, even if it is necessary to perform console switching very frequently.

Also, as the database is a rewritable text file, an operator does not need to bother with the details of each server, as long as there is no change to the port information. Even if server connection destinations are changed, or the number of conventional devices increases or decreases, an operator is not bothered by the details of the changes, because the text file is collectively managed.

Also, the same operations can be performed, regardless of whether it is IPv4 or IPv6. The console switch 100 and the conventional devices 200 through 2nn only need to hold MAC address information, but does not need to hold the IP addresses of the conventional devices 200 through 2nn. Accordingly, the conventional devices 200 through 2nn can be arranged in a flexible fashion, using PnP (Plug-and-Play) with IPv6 or DHCP with IPv4.

Also, server login information is replaced with the information generated when each operator logs in with the console switch 100, and the information can be used by each operator to determine whether access to each desired server is allowed. Accordingly, the operation efficiency is increased. Further, as log information can be stored in the console switch 100, data can be accumulated up to the capacity of the file system. Once a terminal connects to the console switch 100, switching operations can be performed through the terminal, without the need to be aware of logins with servers.

Each of the procedures in the console switch 100 is carried out in accordance with a path connecting program. The path connecting program cooperates with hardware, and performs path connections between terminals and the ports of information processing devices in cooperation with the hardware. As shown in FIG. 10, the hardware includes the CPU 101, the ROM 109, and RAM 110.

A path connecting method is stored as the path connecting program in a storage medium such as the RAM 109, a FD, a HD, or a CD-ROM. Such a path connecting method is read out and loaded into the RAM 110 for execution.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A console switch that selectively connects a terminal to a hardware port of an information processing device that has a plurality of hardware ports connected through a network, the console switch comprising:
    a first unit that obtains information from the terminal, the information specifying the hardware port of the information processing device to be connected;
    a second unit that refers to a predetermined database based on the information obtained by the first unit, and establishes a connection path between the terminal and the hardware port of the information processing device;
    a storage unit for storing first information corresponding to hardware ports;
    a first tuning button that exchanges said first information corresponding to hardware ports included in the console switch with another console switch connected to the network, the other console switch having a second tuning button that exchanges second information corresponding to hardware ports included in the other console switch with the console switch;
        wherein if the first information corresponds to less hardware ports than the second information, only the information corresponding to the number of hardware ports of the first information is exchanged;
        wherein if the second information corresponds to less hardware ports than the first information, only the information corresponding to the number of hardware ports of the second information is exchanged; and
    an examining unit that determines whether transmission and reception data generated between the terminal and the hardware port of the information processing device are to be accumulated as logs based on said transmission and reception data;
    wherein when the first tuning button is engaged, a first tuning signal is transmitted to the other console switch;
    wherein when the second tuning button is engaged in response to receiving the first tuning signal, a second tuning signal is transmitted to the console switch;
    wherein when the first tuning button and the second tuning button are engaged, the first information and the second information are interactively exchanged between the console switch and the other console switch using a data handshake.

2. The console switch as claimed in claim 1, further comprising a third unit that automatically connects to each hardware port of the information processing device after activation of the console switch.

3. The console switch as claimed in claim 1, further comprising a fourth unit that, after activation of the console switch, obtains the MAC address and the IP address of the information processing device, associate the MAC address and the IP address of the information processing device with the information, and stores the MAC address and the IP address associated with the information in the predetermined database.

4. The console switch as claimed in claim 1, wherein, when a connection path has not yet been established between the terminal and the hardware port of the information processing device corresponding to the information obtained by the first unit, the second unit detects the IP address from the MAC address of the information processing device corresponding to the obtained information, and then establishes a connection path between the terminal and the hardware port of the information processing device.

5. The console switch as claimed in claim 1, further comprising a fifth unit that outputs a message to notify that a connection to the terminal has been established, when a connection path between the terminal and the hardware port of the information processing device has been established by the second unit.

6. The console switch as claimed in claim 1, wherein the information includes a port number allocated to the hardware port of the information processing device, or a port name allocated to the hardware port of the information processing device.

7. The console switch as claimed in claim 1, wherein the predetermined database is managed as a text file.

8. The console switch as claimed in claim 1, further comprising a memory unit that stores messages to be outputted onto a screen of the terminal.

9. The console switch as claimed in claim 8, wherein the memory unit stores data outputted from the hardware port of the information processing device.

10. The console switch as claimed in claim 8, wherein the memory unit stores transmission and reception data generated between the terminal and the hardware port of the information processing, in association with one of a date, a terminal path, user information, and a server connection path.

11. A system comprising:
    a terminal;
    an information processing device that has a plurality of hardware ports; and
    a console switch that is connected to and interposed between the terminal and the information processing device, and establishes a connection path between the terminal and a hardware port of the information processing device,
    the console switch comprising:
        a first unit that obtains information from the terminal, the information specifying the port of the information processing device to be connected;

a second unit that refers to a predetermined database based on the information obtained by the first unit, and establishes a connection path between the terminal and the hardware port of the information processing device; and
a first tuning button that exchanges said first information corresponding to hardware ports included in the console switch with another console switch connected to the network, the other console switch having a second tuning button that exchanges second information corresponding to hardware ports included in the other console switch with the console switch;
wherein if the first information corresponds to less hardware ports than the second information, only the information corresponding to the number of hardware ports of the first information is exchanged;
wherein if the second information corresponds to less hardware ports than the first information, only the information corresponding to the number of hardware ports of the second information is exchanged; and
an examining unit that determines whether transmission and reception data generated between the terminal and the hardware port of the information processing device are to be accumulated as logs based on said transmission and reception data;
wherein when the first tuning button is engaged, a first tuning signal is transmitted to the other console switch;
wherein when the second tuning button is engaged in response to receiving the first tuning signal, a second tuning signal is transmitted to the console switch;
wherein when the first tuning button and the second tuning button are engaged, the first information and the second information are interactively exchanged between the console switch and the other console switch using a data handshake.

12. The system as claimed in claim 11, wherein the information processing device is cascade-connected.

13. A system comprising:
a first console switch; and
a second console switch that is connected to the first console switch through a network, the first console switch and the second console switch each selectively connecting a terminal to a hardware port of an information processing device that has a plurality of hardware ports connected through a network,
the first console switch and the second console switch each comprising:
a first unit that obtains information from the terminal, the information specifying the hardware port of the information processing device to be connected;
a second unit that refers to a predetermined database in accordance with the information obtained by the first unit, and establishes a connection path between the terminal and the hardware port of the information processing device;
a first tuning button that exchanges said first information corresponding to hardware ports included in the console switch with another console switch connected to the network, the other console switch having a second tuning button that exchanges second information corresponding to hardware ports included in the other console switch with the console switch;
wherein if the first information corresponds to less hardware ports than the second information, only the information corresponding to the number of hardware ports of the first information is exchanged;
wherein if the second information corresponds to less hardware ports than the first information, only the information corresponding to the number of hardware ports of the second information is exchanged; and
an examining unit that determines whether transmission and reception data generated between the terminal and the hardware port of the information processing device are to be accumulated as logs based on said transmission and reception data;
wherein when the first tuning button is engaged, a first tuning signal is transmitted to the other console switch;
wherein when the second tuning button is engaged in response to receiving the first tuning signal, a second tuning signal is transmitted to the console switch;
wherein when the first tuning button and the second tuning button are engaged, the first information and the second information are interactively exchanged between the console switch and the other console switch using a data handshake.

14. A method of selectively connecting a terminal to a hardware port of an information processing device that has a plurality of hardware ports connected through a network, the method being executed by each of a console switch having a first tuning button and another console switch having a second tuning button, the method comprising:
obtaining information from the terminal, the information specifying the hardware port of the information processing device to be connected;
referring to a predetermined database in accordance with the obtained information, and then establishing a connection path between the terminal and the hardware port of the information processing device;
engaging a first tuning button within the console switch, and in response to the activation, transmitting a first tuning signal to another console switch;
engaging a second tuning button within the other console switch, and in response to the activation, transmitting a second tuning signal to the console switch;
examining transmission and reception data generated between the terminal and the hardware port of the information processing device to determine whether the transmission and reception data is to be accumulated as logs based on the transmission and reception data; and
exchanging first information corresponding to hardware ports included in the console switch with the other console switch connected to the network, the other console switch exchanging second information corresponding to hardware ports included in the other console switch with the console switch;
wherein if the first information corresponds to less hardware ports than the second information, only the information corresponding to the number of hardware ports of the first information is exchanged;
wherein if the first information corresponds to less hardware ports than the second information, only the information corresponding to the number of hardware ports of the second information is exchanged; and
wherein when the first tuning button and the second tuning button are engaged, the first information and the second information are interactively exchanged between the console switch and the other console switch using a data handshake.

15. The method as claimed in claim 14, further comprising performing automatic connection to each hardware port of the information processing device.

16. The method as claimed in claim 14, further comprising obtaining the MAC address and the IP address of the information processing device, and storing the MAC address and the IP address of the information processing device in the predetermined database, the MAC address and the IP address being associated with the information.

17. The method as claimed in claim 14, wherein, when a connection path has not yet been established between the terminal and the hardware port of the information processing device corresponding to the port information obtained in the information obtaining, the IP address of the information processing device is detected from the MAC address of the information processing device corresponding to the obtained information, and a connection path is then established between the terminal and the hardware port of the information processing device.

18. The method as claimed in claim 14, further comprising outputting a message to notify that a connection to the terminal has been established, when a connection path between the terminal and the hardware port of the information processing device has been established.

19. The method as claimed in claim 14, wherein the information includes a port number allocated to the hardware port of the information processing device, or a port name allocated to the hardware port of the information processing device.

20. A computer program product stored in a storage medium for causing a computer to selectively connect a terminal to a hardware port of an information processing device that has a plurality of hardware ports connected through a network, the computer having a first tuning button and another computer having a second tuning button, the program comprising:

instructions for obtaining information from the terminal, the information specifying the hardware port of the information processing device to be connected;

instructions for referring to a predetermined database in accordance with the obtained information, and then establishing a connection path between the terminal and the hardware port of the information processing device;

instructions for examining transmission and reception data generated between the terminal and the hardware port of the information processing device to determine whether the transmission and reception data is to be accumulated as logs based on the transmission and reception data;

transmitting a first tuning signal to another console switch in response to a first tuning button in the console switch being engaged;

transmitting a second tuning signal to the console switch in response to a second tuning button in another console switch being engaged; and instructions for exchanging first information corresponding to hardware ports included in the console switch with the other console switch connected to the network, the other console switch exchanging second information corresponding to hardware ports included in the other console switch with the console switch;

wherein if the first information corresponds to less hardware ports than the second information, only the information corresponding to the number of hardware ports of the first information is exchanged;

wherein if the second information corresponds to less hardware ports than the first information, only the information corresponding to the number of hardware ports of the second information is exchanged; and wherein when the first tuning button and the second tuning button are engaged, the first information and the second information are interactively exchanged between the console switch and the other console switch using a data handshake.

21. The computer program product as claimed in claim 20, further comprising instructions for performing automatic connection to each hardware port of the information processing device after activation of the computer.

22. The computer program product as claimed in claim 20, further comprising instructions for obtaining, after activation of the computer, the MAC address and the tP address of the information processing device, and then storing the MAC address and the IP address of the information processing device in the predetermined database, the MAC address and the IP address being associated with the information.

23. The computer program product as claimed in claim 20, wherein, when a connection path has not yet been established between the terminal and the hardware port of the information processing device corresponding to the obtained port information, the IP address of the information processing device is detected from the MAC address of the information processing device corresponding to the obtained information, and then a connection path is established between the terminal and the hardware port of the information processing device.

24. The computer program product as claimed in claim 20, further comprising instructions for outputting a message to notify that a connection to the terminal has been established, when the connection path between the terminal and the hardware port of the information processing device has been established.

25. The computer program product as claimed in claim 20, wherein the information includes a port number allocated to the hardware port of the information processing device, or a port name associated with the hardware port of the information processing device.

* * * * *

UNITED STATES PATENT AND TRADEMARK OFFICE
CERTIFICATE OF CORRECTION

PATENT NO. : 7,562,155 B2
APPLICATION NO. : 10/763162
DATED : July 14, 2009
INVENTOR(S) : Naoyuki Nagao Page 1 of 1

It is certified that error appears in the above-identified patent and that said Letters Patent is hereby corrected as shown below:

Column 24, Line 26, change "tP" to --IP--.

Signed and Sealed this

Twentieth Day of October, 2009

David J. Kappos
*Director of the United States Patent and Trademark Office*